US006708176B2

(12) United States Patent
Strunk et al.

(10) Patent No.: US 6,708,176 B2
(45) Date of Patent: Mar. 16, 2004

(54) SYSTEM AND METHOD FOR INTERACTIVE ADVERTISING

(75) Inventors: David D. Strunk, Weddington, NC (US); Aaron D. Kephart, Charlotte, NC (US); Steven J. Liseski, Mooresville, NC (US); Robin M. Fields, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 10/120,451

(22) Filed: Apr. 12, 2002

(65) Prior Publication Data

US 2003/0078840 A1 Apr. 24, 2003

Related U.S. Application Data

(60) Provisional application No. 60/330,071, filed on Oct. 19, 2001.

(51) Int. Cl.[7] .............................................. G06F 17/30
(52) U.S. Cl. .............................................. 707/10; 707/9
(58) Field of Search ........................... 707/4, 101, 102; 235/379; 379/93.17; 463/42; 700/83; 705/1, 14, 26; 709/203, 218; 713/186, 201; 725/6, 22, 23, 42

(56) References Cited

U.S. PATENT DOCUMENTS

| | | | |
|---|---|---|---|
| 5,305,195 A | | 4/1994 | Murphy |
| 5,473,143 A | | 12/1995 | Vak et al. |
| 5,619,558 A | | 4/1997 | Jheeta |
| 5,764,736 A | | 6/1998 | Shachar et al. |
| 5,870,724 A | | 2/1999 | Lawlor et al. |
| 5,923,736 A | * | 7/1999 | Shachar .................. 379/93.17 |
| 5,933,811 A | | 8/1999 | Angles et al. |
| 6,035,280 A | | 3/2000 | Christensen |
| 6,085,177 A | | 7/2000 | Semple et al. |
| 6,108,437 A | | 8/2000 | Lin |
| 6,144,944 A | | 11/2000 | Kurtzman, II et al. |
| 6,149,055 A | | 11/2000 | Gatto |
| 6,264,560 B1 | * | 7/2001 | Goldberg et al. ............. 463/42 |
| 6,308,887 B1 | * | 10/2001 | Korman et al. ............. 235/379 |
| 2001/0029528 A1 | | 10/2001 | Coutts et al. |

FOREIGN PATENT DOCUMENTS

| WO | WO 00/75889 | 12/2000 |
|---|---|---|

OTHER PUBLICATIONS

In Touch with Your Business, Elo TouchSystems, at http://www.elotouch.com (printed on Aug. 5, 2002).
Glass Vu/Transvu/LumenStar/HoloGraphic Presentations at http://www.glassvu.ca/home.html (printed on Aug. 5, 2002).
Lee, W.A., "Customized Ads, Coming to ATMs?" American Banker, Sep. 5, 2000, vol. 169, No. 166, p. 8.
Stock, H., "Coming Next to Your Local Bank: ATM's That Allow Internet Access?" American Banker, Mar. 9, 2000, vol. 165, No. 47, p. 20A.

(List continued on next page.)

*Primary Examiner*—Diane D. Mizrahi
*Assistant Examiner*—Apu M Mofiz
(74) *Attorney, Agent, or Firm*—Michael A. Springs; Covington & Burling

(57) ABSTRACT

An interactive advertising and public announcement system having storage and processing capabilities, as well as a display device, configured to store, process and/or display a media presentation. The media presentation proceeds according to a Playlist that may incorporate links to web-based content. The display device includes input devices allowing a user to interact with the media presentation and customer recognition devices for detecting the presence of and identifying the user. The system may also include video-conferencing capabilities, and the ability to detect, upload and respond to information obtained from and regarding the user. The system may also be linked and configured to retrieve and respond to user information collected from the user while the user interacts with the system, as well as user information previously-collected and stored in local or remote databases.

98 Claims, 13 Drawing Sheets

OTHER PUBLICATIONS

Anon., "The Year of the Thin Client," Cards International, Dec. 11, 1996, vol. 169, p. 7.

Edwards, R., "ATMs—the Hot New Media Buy, " ABA Banking Journal, Mar. 1999, vol. 91, No. 3, pp. 58–60.

Anon., "Drilling for Customer Data on ATMs Made Easier," Bank Network News, Jun. 9, 1999.

Redman, R., "Wells Fargo to Web–enable 6,300 Machines," Bank Systems and Technology, Jul. 2000, vol. 37, No. 7, pp. 18.

Anon., "ATM Prospectors See Data Mining Gold," Bank Network News, Jan. 13, 1998.

* cited by examiner

SYSTEM AND METHOD FOR INTERACTIVE ADVERTISING

CROSS REFERENCE TO RELATED APPLICATIONS

This Application claims priority under 35 U.S.C. §119(e) to U.S. Provisional Application No. 60/330,071, filed Oct. 19, 2001, the entirety of which is incorporated into this specification by reference.

BACKGROUND OF THE INVENTION

1. Field of the Invention

This invention generally relates to public advertising and announcement systems, and more particularly to systems and methods for delivering advertisements and announcements to the public in a targeted and interactive manner.

2. Description of the Background Art

Print advertising and other printed public announcements are usually delivered to the public using static advertising devices, such as billboards, posters, newspapers, magazines, brochures, flyers and handouts, or non-static advertising devices, such as television, radio and video tape. It has been found, however, that static advertising devices are not very effective at attracting public attention, and non-static advertising devices, which are better at attracting public attention because they move, blink, talk or change, are often too expensive and rarely achieve the significant results advertisers desire. Both kinds of advertising devices usually require a very large number of placements in order to produce only a few new sales leads.

One explanation for the limited success of advertising and announcements delivered to the public through conventional advertising devices is that such advertisements and announcements tend to be extremely generic, playing to the lowest common denominator among large and diverse groups of potential customers. They are not targeted to reach specific audiences, groups or individuals. The content of these ads and announcements must be very generic because the devices through which they are delivered have no way of identifying specific members of the audience and no way of detecting, retrieving or utilizing personal information about members of the audience in order to automatically provide more interesting, non-generic ads and announcements. As a result, these ads and announcements are far less likely to make a meaningful impression on any particular individual or group of individuals exposed to them.

Another explanation for the limited success of conventional advertising devices lies in the fact that they do not provide interactive engagement and instant feedback. It has been found, for example, that the longer it takes a potential customer to go through the psychological phases of making a purchase decision (awareness, self-education, validation and commitment, for instance), the lower the likelihood that the customer will actually purchase the advertised goods or services. Static and one-way advertising and announcement systems may make the customer aware of the goods or services being advertised, but they typically do not take questions or respond to instructions or commands from the audience. Without the ability to ask questions or give instructions, potential customers cannot use the advertising device to educate themselves about the specific features of the goods and services being advertised or announced, and they cannot obtain enough information to validate an idea or belief that the goods or services will satisfy a particular need or desire. Most importantly, the customer cannot use the advertising device to make a purchase.

Accordingly, there is a need for a public advertising and announcement device that has the ability to identify specific individuals or groups of individuals who come into contact with the device, the ability to collect, gather and use personal information about those individuals or groups to select and present more interesting, targeted ads and announcements, and the ability to respond to questions, commands and instructions submitted by those individuals and groups.

SUMMARY OF THE INVENTION

With these and other needs in mind, the present invention overcomes the shortcomings of conventional systems by providing systems and methods for delivering public ads and announcements in an interactive format. The invention displays ads and announcements to the public, gathers personal information about the audience from the audience or from databases in order to provide ads and announcements that are specifically targeted to the audience, and responds to questions and commands provided by the audience. The invention engages potential customers in a two-way interactive communication session about products and services particularly interesting or relevant to the customers, and provides instant feedback so that the customer is more likely to make a favorable purchase or participation decision, preferably on the spot.

In general, the invention comprises (i) a Group Display Device, (ii) a Distributed Storage Array comprising at least one Storage Device, and (iii) a Distributed Processor Array coupled to the Distributed Storage Array. The Group Display Device comprises an Input Device. The Distributed Processor Array comprises at least one Processor. The Distributed Storage Array stores a Program for controlling the Distributed Processor Array. The Distributed Processor Array is operative with the Program to generate at least one Interactive Poster on the Group Display Device and to configure the Interactive Poster responsive to the Input Device.

In another aspect of the present invention, a method for presenting announcements to a user, is provided. The method comprises the steps of: (1) providing a Group Display Device, a Customer Identification Device, a first memory storage area containing a plurality of media elements, and a second memory storage area containing personal information about the user; and (2) displaying on the Group Display Device a subset of the plurality of media elements in response to the user activating the Customer Identification Device. The subset of the plurality of media elements displayed on the Group Display Device is determined by reference to the personal information. In this embodiment, as well as other embodiments of the present invention, the Customer Identification Device may comprise, for example, a magnetic stripe reader, a card, key fob, lapel pin, ring, bracelet, or other small device having a transponder or readable computer chip, a remote identification sensing device, a crowd evaluation device or a Customer Biometrics Sensing Device. The Customer Identification Device also may comprise, in some embodiments, a combination of one or more of these devices.

In a preferred embodiment, the present invention also comprises an Input Device, such as a mouse, keyboard, a touch-sensitive surface or screen, a button or a microphone, configured to accept input and commands from the user. When such an Input Device is present, the system may be configured so that the subset of the plurality of media elements displayed on the Group Display device is responsive to this Input Device.

FEATURES AND ADVANTAGES OF THE INVENTION

It is a feature of the present invention that it provides a method of presenting ads and announcements in an interactive format.

It is another feature of the invention that it can identify users, can gather personal information about users (directly from the users or from customer information databases), and can use the information to select and display personalized and targeted ads and announcements.

It is yet another feature of the invention that it can respond to questions and commands supplied by a user.

An advantage to using the present invention is that ads and announcements may be tailored to address the specific needs, interests and desires of specific individuals and specific groups of individuals, thereby making the ads and announcements much more effective at attracting public attention and increasing patronage.

Additional features and advantages of the invention are set forth in part in the description which follows, and are in part obvious from the description, or may be learned by practice of the invention. The features and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

In the accompanying drawings.

DEFINITIONS

Figure 1A:
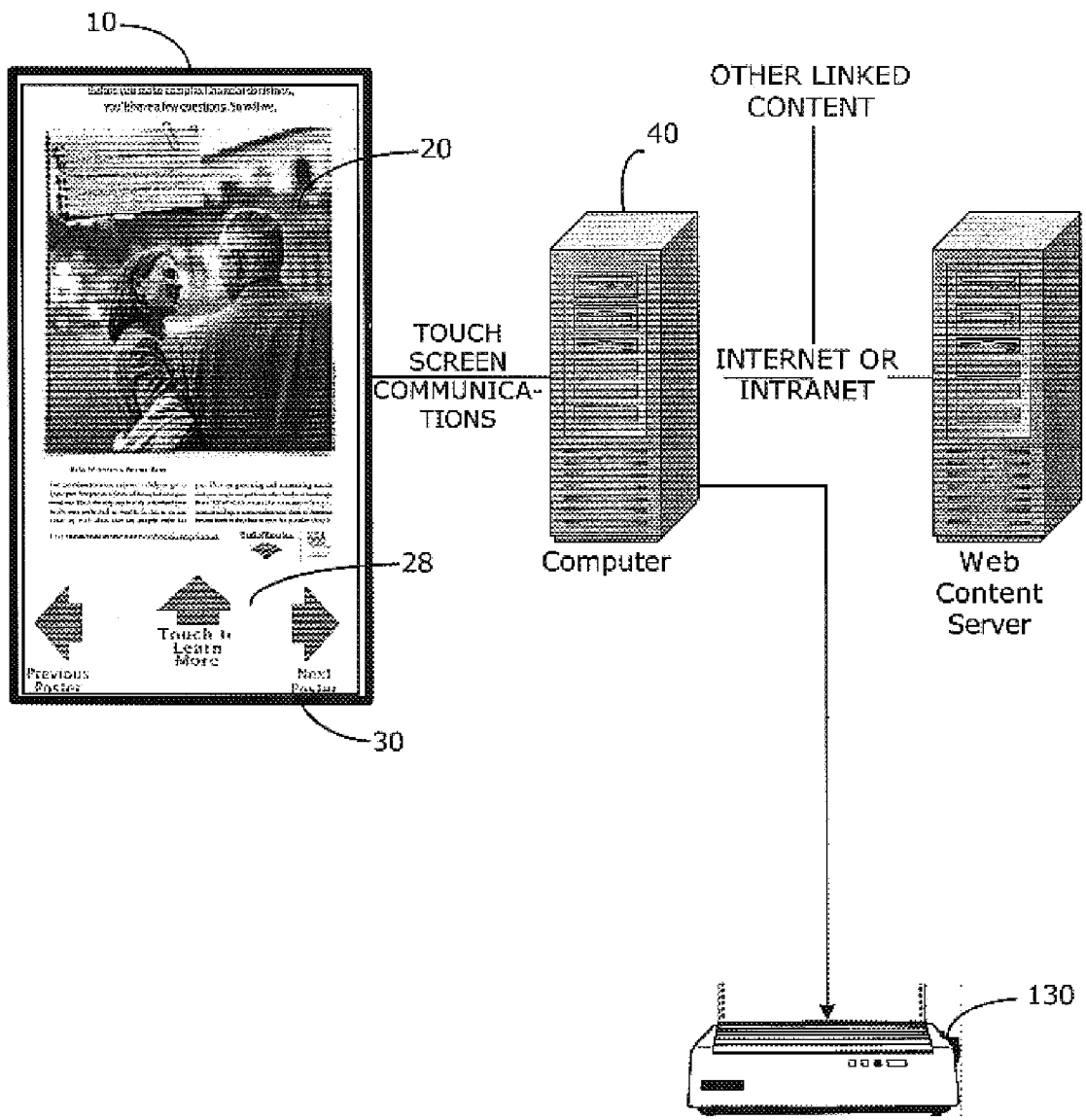
FIG. 1A is a diagram of some embodiments of the present invention.

Unless otherwise noted in this specification or in the claims, all of the terms used in the specification and the claims will have the meanings normally ascribed to these terms by workers in the art. Certain terms specifically comprise the meanings associated with them as follows:

Group Display Device: A device that is generally, but not necessarily, used for displaying visual information to two or more persons simultaneously. For example, in some embodiments of the present invention, devices such as large television screens and large plasma display panels are Group Display Devices. In other embodiments, glass display technology may be used. With glass display technology, for example, the advertisement or announcement can be displayed on a pane of glass. The glass pane used for this embodiment may comprise, for example, an interior or exterior window, door or wall of a building, such as a bank, for instance. A touch-sensitive film may be integrated with the glass so that users may provide input by touching the glass pane. In such an embodiment, the advertisement or announcement may be projected onto the glass pane from a projection device suspended from a nearby wall or ceiling, or positioned on a nearby floor-stand. Touch-sensitive film and glass display technology that can be adapted for use with the present invention can be obtained from various sources in the industry, including, for example, Telematics Canada, Inc., located at 1500-2B Alberni Street, Vancouver, British Columbia V6G3C9, which provides a glass display technology known as "GlassVu,™" and Elo TouchSystems, Inc., located at 6500 Kaiser Drive, Fremont, Calif. 94555, which provides touch-sensitive film for glass displays.

Input Device: A device that receives commands and/or information from a user. The commands and/or information may be received in the form of touch, voice, motions or other means as are known in the art. For example, in some embodiments of the present invention, Input Devices include touch screens, computer mice, keyboards, video cameras, motion detectors and microphones.

Distributed Storage Array: One or more Storage Devices that are logically or physically coupled, or both. For example, a single Storage Device is a Distributed Storage Array. Another example of a Distributed Storage Array is a plurality of Storage Devices that are in physically different locations but are logically or physically coupled, or both. The Distributed Storage Array may be associated with one or more Group Display Devices.

Storage Device: A physical or virtual element for storing programs or data for manipulation by computer systems. Physical Storage Devices comprise memory modules, random access memory chips (RAM), various programmable memory chips, fixed and removable disk drives, and other computer storage devices as are known in the art. Virtual Storage Devices comprise virtual memory pages, virtual disks and other Physical Storage Devices that are simulated by software, and other virtual storage elements as are known in the art.

Distributed Processor Array: One or more Processors that are logically or physically coupled, or both. For example, a single Processor is a Distributed Processor Array. Another example of a Distributed Processor Array is a plurality of Processors that are in physically different locations but are logically or physically coupled, or both. The Distributed Processor Array may be associated with one or more Group Display Devices.

Processor: A physical or virtual element whose operation is controlled by one or more computer programs. Processors comprise general purpose computer systems, special purpose computer systems, distributed computer systems, processor chips, discrete electronic circuits, processors that are simulated by software, and other computer processing devices as are known in the art.

Program: Instructions, data, or other functional descriptive material, stored in a Distributed Storage Array, for controlling a Distributed Processor Array. For example, a Program may reside on a Distributed Storage Array consisting of a single Storage Device and may control a Distributed Processor Array consisting of a single Processor, where both the Storage Device and the Processor are components of an electronic device, such as a personal computer. In another example, a Program may reside on a Distributed Storage Array consisting of a plurality of geographically separated Storage Devices and may control a Distributed Processor Array consisting of a plurality of geographically separated Processors. In this example, the Storage Devices and Processors may be grouped to form a plurality of electronic or computer systems that are coupled through computer communications networks such as the Internet or an intranet.

Focused Audio Device: A device for projecting sound into certain target locations such that the sound is substantially audible to persons in close physical proximity to the target locations and is substantially inaudible to persons not in close physical proximity to the target locations. For example, and in some embodiments of the present invention, a Focused Audio Device projects sound only to certain locations in close physical proximity to a Group Display Device, such as directly in front of the Group Display Device. Persons who are not directly in front of the Group Display Device would not be able to hear the sound or at most would hear very little of the sound. Thus, a customer interacting with the Group Display Device could have some degree of privacy, at least with regard to the audio program of an Interactive Poster, while persons who are not interacting with the Group Display Device would not be disturbed very much, if at all, by the audio program.

Hardcopy Output Device: A device, such as a printer, that outputs tangible information to a user. An Output Device may be embodied, for example, as a printer that outputs paper brochures, receipts or tickets.

Imaging Device: An image recording device, such as a digital or analog video or still camera, that records visible images of people and objects that are in the vicinity of a Group Display Device, such as directly in front of the Group Display Device. In some embodiments, the Imaging Device may be used to capture and/or record the physical characteristics, e.g., physical appearance, face, iris and retinal characteristics, of a crowd or individual user so that these physical characteristics may be processed by a Crowd Evaluation Device or a Customer Biometrics Sensing Device.

Video Conferencing System: Hardware or software components, or both, residing at a first location configured to transmit and receive audio, video and/or still image data to and from similar equipment situated at a second location, and configured to provide synchronized video and audio communication between the first and second locations. A Video Conferencing System may comprise, for example, an Imaging Device and a Focused Audio Device, both attached to a Group Display Device, and configured to transmit and receive audio, video and still image data to and from a location that is different from the location of the Group Display Device. The audio transmitting components of the Video Conferencing System may also be used to capture and/or record audio characteristics, e.g., voice patterns, of a crowd or individual user so that these audio characteristics may be processed by a Crowd Evaluation Device or a Customer Biometrics Sensing Device.

Customer Identification Device: A device for identifying particular persons. In some embodiments of the present invention, a Customer Identification Device is used to identify a person who is interacting with an Interactive Poster. For example, and in some embodiments of the present invention, a magnetic stripe reader for reading the magnetic stripes on various types of identification cards, including credit cards, debit cards, gasoline cards, and bank cards. In some embodiments, a magnetic stripe reader is affixed to a Group Display Device so that a customer can identify himself when interacting with particular Interactive Posters.

Remote Identification Sensing Device: A form of a Customer Identification Device that uses a transceiver (sensor) and radio frequency, sonic, infrared, or other electromagnetic transmission signals to uniquely identify and communicate with a transponder carried by a person. The transponder is typically physically small and embedded in a small portable object, such as a card, key fob, pen, bracelet, badge, button, ring, lapel pin or tag. For example, and in some embodiments, a bank may issue credit cards or ATM cards containing transponders that respond to certain radio frequency signals generated by the transceiver. When a bank customer carrying such a card interacts with or comes into the vicinity of an Group Display Device, the Group Display Device may use a Remote Identification Sensing Device to query the card and determine the identity of the person to whom the card was issued.

The transponder in a Remote Identification Sensing Device may be configured, as is known in the art, to be passive or active. A passive transponder must be used with an active transceiver that senses and activates the transponder and decodes and transcribes the data the transponder contains. Magnetic labels, such as those affixed to credit cards and store items, are common examples of passive transponders. When activated, the transponder uses the energy of the transmission signals from the transceiver to frame a response and send data back to the transceiver. The data is then typically used to notify a programmable logic controller that an action should occur. The action could be as simple as showing the next Interactive Poster in a given sequence of Interactive Posters, or as complicated as interfacing with a database to select an ad specifically targeted to the person to which the transponder was issued, or to carry out a monetary transaction. An active transponder has its own power source and is capable of sending and receiving identification signals to or from any transceiver in the vicinity tuned to the appropriate electromagnetic signal frequency.

Multiple frequency ranges for transmission signals may be used, depending on the requirements of the application, to control the range and penetration of the Remote Identification Sensing Device. For example, low-frequency RFID systems (30 KHz to 500 KHz) have short transmission ranges (generally less than six feet), while high-frequency RFID systems (850 MHz to 950 MHz and 2.4 GHz to 2.5 GHz) offer longer transmission ranges (more than 90 feet). Some Remote Identification Sensing Devices are designed to require direct physical contact between the transceiver (sensor) and the transponder. An example of this kind of device would include cards that are designed to be swiped through a card reader.

Crowd Evaluation Device: A form of Customer Identification Device that senses predetermined characteristics related to the presence and activities of one or more persons. For example, and in some embodiments, a Remote Identification Sensing Device may be used as a Crowd Evaluation Device to identify each person within range of the Remote Identification Sensing Device that is carrying a remote identification transponder, such as a card, key fob, badge or tag. The identities of these persons may then be used to select appropriate Interactive Posters to display to these persons. Other exemplary Crowd Evaluation Devices include a video camera, a motion detector, a heat sensor, and an audio sensor. For example and in some embodiments, information provided by a Crowd Evaluation Device may be used to determine for a particular location, crowd characteristics, including but not limited to: if there are many or few people; if the people are moving regularly or are motionless; and if the people are noisy or quiet. This information may then be used to select appropriate Interactive Posters to display to the crowd.

Customer Biometrics Sensing Device: A form of Customer Identification Device that uses the physical characteristics of a person to identify that person or to collect information about that person. For example, a person's overall physical appearance, face, voice, iris characteristics, retinal characteristics, and fingerprints may be used alone or in combination with other characteristics to identify the person. In some embodiments of the present invention, a Customer Biometrics Sensing Device is used to identify and/or collect information about the person who is interacting with an Interactive Poster. The device may be configured, for example, to detect whether there are people in the vicinity having characteristics such as eyeglasses or gray hair. Such information might be useful, for example, in determining whether a person or crowd fits a given demographic profile, which could determine, for instance, which Interactive Posters to display. In other embodiments, a Customer Biometrics Sensing Device may be used in combination with other devices, such as a magnetic stripe reader or a Remote Identification Sensing Device, to assist in confirming the identity of a person. In yet other embodiments, a Customer Biometrics Sensing Device may be used as a Crowd Evaluation Device.

Playlist: A device, file, program, database or data structure, or a combination of one or more devices, files, programs, databases or datastructures, configured to control the sequence and timing of the display of Interactive Posters. In some embodiments, the Playlist comprises a list of the Interactive Posters to be displayed on a particular Group Display Device and a set of parameters for controlling the timing and sequencing of the display of the Interactive Posters. For example, and in some embodiments, the Playlist may display each of the Interactive Posters in a predetermined sequence for a predetermined amount of time. In another example, and in some embodiments, the Playlist may be altered by the insertion of select Interactive Posters to be displayed and timing of the displays in response to inputs related to, for example, a Crowd Evaluation Device, a Customer Biometrics Sensing Device, the day of the week, the time of day, and other advertising targeting techniques, as are known in the art.

Interactive Poster: An interactive and coordinated collection of media for a particular advertising campaign. In some embodiments of the present invention, an Interactive Poster comprises a set of linked documents, text messages and display images, and associated software for processing customer inputs, for determining which documents, text messages and display images will be presented to the customer, and for collecting information from customers. More complex embodiments comprise such elements as linked video presentations, linked audio presentations, teleconferencing, and database access that are responsive to customer identification devices, customer input devices and information retrieved from customer information databases. Embodiments of the present invention may comprise one or more Interactive Posters.

OVERVIEW OF EMBODIMENTS OF THE INVENTION

Those with skill in the art will recognize that embodiments of the present invention may be beneficially applied in a large number of different situations. In some embodiments, for example, a particular Interactive Poster concerns a bank's home equity loan advertising campaign. The display images comprise an introductory home equity loan advertisement, a home equity calculator screen, and a teleconferencing screen providing access to a remotely-located live bank representative. The introductory advertisement is displayed on a Group Display Device in the lobby of the bank so that it is generally visible to customers as they transit the lobby. An audio program, which accompanies each display image, is played over one or more speakers attached to or located in the vicinity of the Group Display Device. An optional Focused Audio Device may also be used to perform the audio program accompanying the introductory advertisement in a manner so that customers are generally unable to hear the audio program unless they are in close physical proximity to the Group Display Device. The Group Display Device also may comprise a touch screen Input Device, a microphone Input Device and/or a magnetic stripe reader Customer Identification Device.

To continue the example, a customer becomes interested in the introductory advertisement and moves close enough to the Group Display Device to hear the audio program. The introductory screen includes a touch screen accessible button for requesting further information. The customer touches this button and the Interactive Poster then displays the home equity calculator screen on the Group Display Device with the associated audio program. The audio program encourages the customer to identify himself by passing his bank card through a magnetic stripe reader attached to the Group Display Device. When the customer thus identifies himself, the Interactive Poster accesses bank databases which may contain information such as the address of the customer's house, and the customer's outstanding mortgage balance and a block assessment of the current market value of the customer's house. The Interactive Poster then uses this address information to search real estate records and produce an estimate of the customer's home equity.

The Interactive Poster then displays the estimated home equity on the home equity calculator screen. In a preferred embodiment, the home equity calculator screen also includes a touch screen accessible button for requesting further information. When the customer touches this button, the Interactive Poster displays a teleconferencing screen that puts the customer in contact with a remotely located bank representative who can further answer the customer's questions via the audio program, the microphone Input Device, and the Group Display Device. As discussed above in reference to the Playlist, embodiments of the present invention comprising a plurality of Interactive Posters may select the Interactive Poster to display at a particular time responsive to a predetermined sequence, responsive to a Crowd Evaluation Device, responsive to a Customer Biometrics Sensing Device, responsive to the day of the week, and/or responsive to the time of day.

In order to produce more effective, targeted advertising campaigns, it is important to have some information about the wants and needs of the potential customer and/or market. To this end, many companies collect great volumes of information about their customers. For example, large banks and other financial services institutions, may obtain information from and about their customers in a variety of different contexts, such as checking and savings account transactions, mortgage account transactions, credit card account transactions, commercial and consumer loan transactions, and investment transactions. Customer information may be obtained through a variety of business channels. These channels include in-person meetings, telephone conversations, written forms, and interactions between customers and companies' electronic systems. These electronic systems include companies' automated kiosks, automatic teller machines and Internet or intranet websites. Much of the customer information collected by such companies may reside on databases and/or certain legacy systems owned or controlled by these companies.

With customer information in hand, a company can individualize its marketing efforts towards its customers. For example, if a bank knows through its information gathering processes that a particular customer or a particular group of customers may be interested in a home equity loan, then it would be beneficial for that bank to present its home equity loan offerings to those customers through the bank's marketing programs. Similarly, for other customers who may be interested in college savings options, it would be beneficial for that bank to provide information about its college savings programs to those customers. Accordingly, preferred embodiments of the present invention provide systems and methods for utilizing previously-collected customer information to select and display targeted ads and announcements to users.

DETAILED DESCRIPTION OF THE PREFERRED EMBODIMENTS

The systems, methods, apparatus elements, and apparatus functions of the present invention may be implemented, as is known in the art, as software running on general or special purpose computers, as hardware, or as combinations of software and hardware.

FIG. 1A depicts an embodiment of the present invention. The embodiment comprises a Group Display Device 10 that is depicted in FIG. 1A as a 16:9 aspect ratio plasma display monitor with a touch screen interface, as is known in the art. A wide variety of other Group Display Devices, as are known in the art, could also be employed. For instance, touch-sensitive glass display technology may be used (as an alternative to a touch-sensitive plasma display monitor) to project text and images comprising advertisements or announcements onto a touch-sensitive pane of glass comprising an internal or external window, door or wall of a building. Telematics Canada, Inc., of Vancouver, British Columbia, and Elo TouchSystems, Inc., of Fremont, Calif., for example, offer touch-sensitive glass display technology products which may be suitably adapted for use in a Group Display Device in one embodiment of the present invention. Group Display Device 10 comprises Poster Display Area 20, Control Area 28 and Input Device 30. The Input Device 30 may include a number of devices that allow a user to interact with the Group Display Device 10. These devices may be located, for example, in the Control Area 28 and/or within the Poster Display Area 20. Although the poster images in Poster Display Area 20 may be viewed in landscape mode, portrait mode may be employed as is known in the art because portrait mode may provide, in some embodiments, more efficient use of the display space and may be more consistent with current graphic design standards. Some embodiments of the invention utilize screen rotation software, as is known in the art, that places Poster Display Area 20 in portrait mode. Ideally, Poster Display Area 20 displays Interactive Posters under control of a Playlist, as described below.

In a preferred embodiment, the Interactive Poster is based on Internet technology—primarily Hyper-Text Markup Language (HTML), JavaScript, VBScript and other industry standards—because of its relative simplicity, ease of deployment, ease of maintenance and the large developer pool it affords. It will be apparent to those of skill in the art, however, that alternative technologies, such as compiled code models or dedicated multimedia environments, for example, may be used to achieve similar results.

In a compiled code implementation of the present invention, the framework for the Interactive Poster is rendered in a compiled language, such as Microsoft's VisualBasic, C, C++, etc. This approach has the benefit of executing faster and allowing for tighter control of certain administrative controls, such as inactivity timers and the like. In most cases, code created in this manner would be platform dependent, and thus more tightly coupled to the operating system. Dedicated multimedia environments, such as AuthorWare or KeyWare, on the other hand, offer the advantages of creating and running Interactive multimedia-based posters in an environment specifically designed and optimized to support multimedia content.

So that the advertising presentation on a Gorup Display Device may be personalized for different users or groups of users, in some embodiments of the invention, a Playlist is created, which may include a plurality of Interactive Posters categorized by subject matter. For example, in the corporate context, a company may categorize its Interactive Posters within a Playlist according to the products and services that the company offers. In particular, a bank may have separate presentations for its home equity line, for its college savings line and for its line of automobile loans. A multiplex theater may, for example, have separate presentations for each movie title. Each such presentation may show the movie trailer with supporting information such as show times and point-of-sale ticketing.

If a company knows that a particular person or a particular group of persons has a particular interest, then, in some embodiments, the Group Display Device can present the appropriate Interactive Poster to that user or to that group of users using the customer recognition capabilities described below. Menus may also be provided within particular Interactive Posters that enable customers to tailor the display to their particular interests.

Figure 1B:
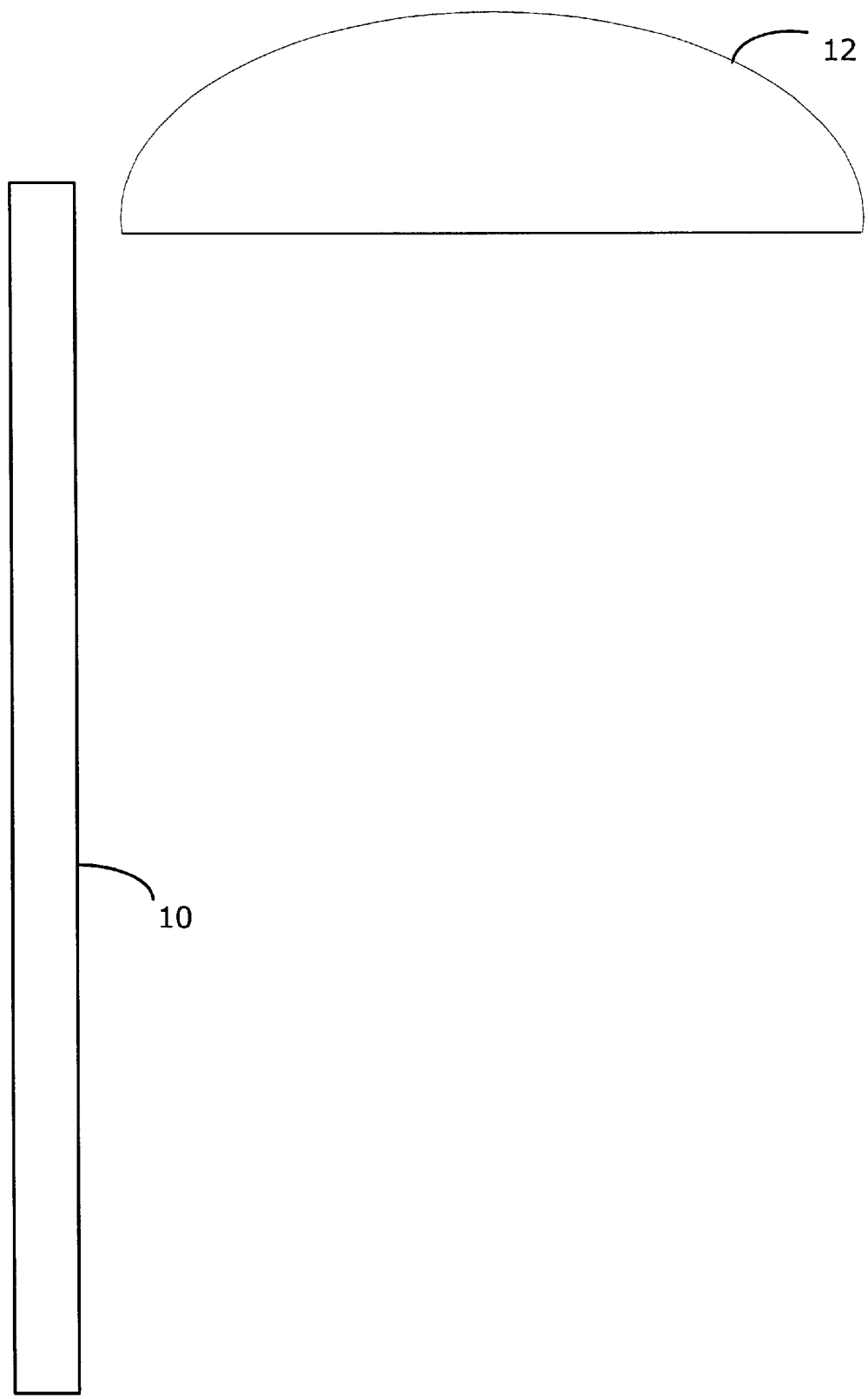
FIG. 1B is a diagram of some embodiments of the Focused Audio Device of the present invention.

FIG. 1B depicts an embodiment of the present invention that includes audio capabilities. In this embodiment, optional Focused Audio Device 12 is positioned directly above and in front of Group Display Device 10. In embodiments that do not include a Focused Audio Device, one or more speakers may be utilized, as is known in the art, to perform the audio program.

Figure 2:
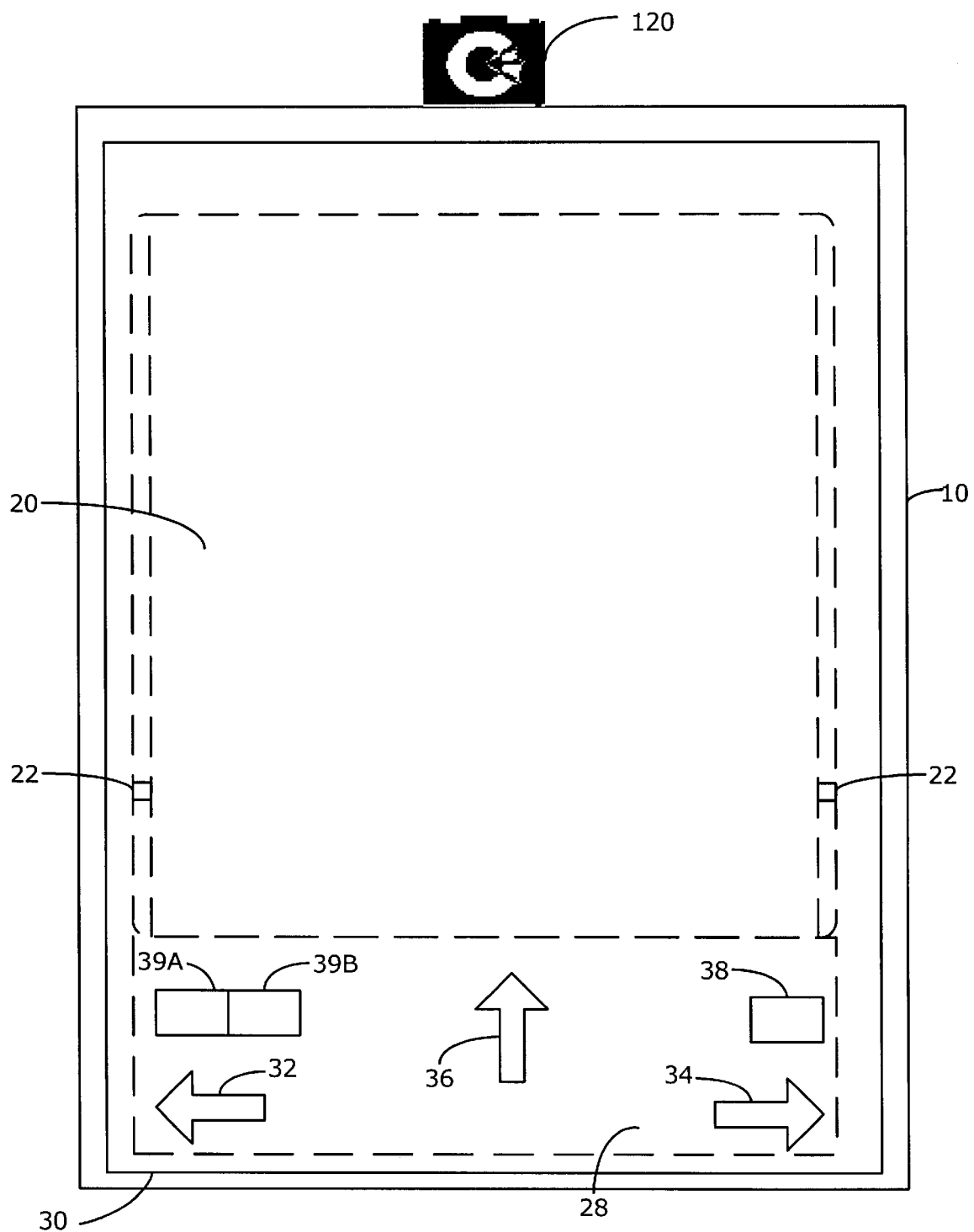
FIG. 2 is a diagram of some embodiments of the Group Display Device of the present invention.

An embodiment of Group Display Device 10 of the present invention is depicted in FIG. 2. In this embodiment, Poster Display Area 20 comprises the upper 75 percent of Group Display Device 10, with Control Area 28 comprising the lower 25 percent of the Group Display Device 10. The Control Area 28 may, for example, be used as a common control surface, incorporating Input Devices that operate similarly for each poster image. Various other configurations of the Group Display Device 10, including configurations that do not include a Control Area may also be employed as is known in the art. In some embodiments, Poster Display Area 20 includes scroll bars 22 for horizontal and/or vertical adjustment of the displayed image, as is known in the art, for situations where the displayed poster image or other media content will not fit into the space defined by Poster Display Area 20. Scroll bars 22 may, for example and in some embodiments, be controlled through a mouse or through user touch utilizing a touch screen interface, as described below.

In the embodiment of the present invention depicted in FIGS. 1 and 2, Input Device 30 comprises a touch screen interface, as is known in the art. In this embodiment, the touch screen interface utilizes virtual control buttons 32, 34, 36, 38, 39A, and 39B in conjunction with a touch detector integrated into the Group Display Device 10 to configure the Interactive Poster being displayed on Group Display Device 10, as is known in the art. The control buttons can be exposed or hidden based upon the contents of a Playlist and/or based upon commands embedded in the poster image currently being displayed. For example and in some embodiments, the virtual control buttons displayed on Group Display Device 10 comprise virtual control button 32 for use in requesting the previous Interactive Poster, virtual control button 34 for requesting the next Interactive Poster, virtual control button 36 for requesting further information about the current Interactive Poster, and virtual control button 38 for requesting a return to the initial display state of the current Interactive Poster. Additional virtual control buttons, such as virtual control button 39A and virtual control button 39B may be used to request help, as discussed below. As is known in the art, any configuration of virtual control buttons and other control mechanisms, including, for example, sliders, check boxes, pull down lists, and radio buttons, may be employed as desired with particular Interactive Posters.

In some embodiments of the invention, the Input Device 30 comprises a voice recognition device. In these embodiments, the customer speaks into a microphone or other similar device. The customer's speech is processed, as is known in the art, and may be used in some embodiments: (1) to navigate among or within Interactive Posters; (2) to provide personal information, such as the customer's name and address; for example, to the application displaying an Interactive Poster; (3) to identify the customer based on the customer's individual voice characteristics prior to selecting an ad targeted to that customer; or (4) all of the above.

In some embodiments, the web page code that displays the Interactive Poster may be configured to define the words that will be recognized by the system. In such an embodiment, the system is programmed to recognize a pre-defined set of words, as well as any alternate set of words that have the same or a similar meaning. The more words that are defined for recognition the more user-friendly the system becomes. The set of recognized words, as well as one or more computer software programs configured to process the recognized words, may be stored in a local computer file or burned into a hardware chipset. If the words and software program are burned into a hardware chipset, the hardware chipset may be configured, in some embodiments, to return a certain number when a certain word is recognized.

In some embodiments, one or more local or remote databases containing as many as 3000–5000 recognized words may be used for voice recognition purposes. An even larger set of recognized words might be required or desired, depending on the complexity of the application. Multiple databases, each containing words related to a particular application, subject matter or topic, could also be used. In such embodiments, certain key words can be contained in each database which are related to the application, subject matter or topic of other databases. When those certain key words are recognized, the system can be configured to switch from the current voice recognition database to the one that matches the new application, subject matter or topic. In this manner, the present invention can be configured to recognize and process an almost unlimited number of words.

Some voice recognition systems have problems recognizing spoken words in public places where multiple people are speaking in close proximity to the microphone. This situation might occur, for example, if people are talking while standing in line at a bank or movie theatre, for instance. In these situations, it is possible for the system to erroneously recognize words from people not currently using the system. To address this problem, the present invention may be configured to include a directional microphone with an adjustable range so that only a person standing directly in front of, and very close to the microphone will be picked up, or a telephone-style handset that allows only the current user to talk to and listen to the system. The present invention may also incorporate voice locking technology, where the system captures and locks onto the voice pattern of the current user and ignores the voices of all other users. The system may be further configured to activate the voice-locking feature only upon the recognition of a key word or key phrase spoken by the current user. The current user may be required to say, for example, "Computer, tell me what my checking account balance is," or "Computer, I would like to purchase a ticket for the next movie." In these examples, when the system recognizes the key word "computer," it captures and then listens for the voice pattern of the one person who spoke the key word and ignores all others.

In some embodiments, the Input Device comprises a motion detection device. In these embodiments, the customer's physical motions, for example, the movement of his hand, are detected as is known in the art. In some embodiments, these detected physical motions are used to navigate among or within Interactive Posters.

Referring again to the embodiment of the present invention depicted in FIG. 1, Group Display Device 10, including Input Device 30, is in communication with Computer System 40. The Computer System 40 comprises a Distributed Processor Array and a Distributed Storage Array. In this embodiment, the Distributed Processor Array is operative with a Program stored in the Distributed Storage Array to generate at least one Interactive Poster on Group Display Device 10 and to configure the generated Interactive Poster in response to Input Device 30. In some embodiments, the Program comprises screen rotation software, such as Pivot Software by Portrait, Displays, Inc., 5117 Johnson Drive, Pleasanton, Calif. 94588 for displaying Interactive Posters in portrait mode. In some embodiments, the Program comprises a web browser, as is known in the art, and Interactive Posters may be implemented as web pages or other Hypertext Markup Language (HTML) documents. In web browser-based embodiments, the Program may further comprise javascript, and/or VBscript capabilities and/or various commercial and custom browser plug-ins to facilitate the display of Interactive Posters.

In the embodiment of FIG. 1, the system includes a Web server 16. As is known in the art, a Web Server 16 may comprise a hardware device, a software program, or a combination of hardware devices and software programs, that serves the files that form World Wide Web pages to Web users using the client/server model and the World Wide Web's Hypertext Transfer Protocol ("HTTP"). As embodied in FIG. 1, the Web server may form part of the Playlist, described below. In other embodiments, the Web server 16 may comprise a master Playlist allowing the Computer 40 to select individual Playlists for customized display presentations.

In some embodiments, the Program comprises a Playlist that controls the generation of Interactive Posters on Group Display Device 10. In some embodiments, the Playlist comprises a set of Interactive Posters, which may be included in the Playlist directly or by reference, where each Interactive Poster is accompanied by a set of display parameters that describe the circumstances under which the associated Interactive Poster will be generated on Group Display Device 10. For example, and in some embodiments, the Playlist will specify or control the order in which the Interactive Posters will be displayed, as well as the length of time each poster will be displayed.

Ideally, the Playlist is implemented as an Extended Markup Language (XML) dataset served up by a centralized database system as the poster begins its display mode cycle. With this approach, the Playlist is self-defining, and the Boolean controls which define the display parameters need not be fixed-position records. This allows the system to use an almost unlimited number of poster-specific controls. The Playlist may also be implemented in a number of alternative ways, including as a centralized database, a local database or a flat file. In some embodiments, the Boolean display control parameters normally contained in the Playlist may be embedded in the poster.

If the Playlist is implemented through a centralized database, display devices placed at various locations, such as bank branches, for example, will query a centralized database to determine which poster to show. Preferably, the query will occur during the Poster Display Mode or during interactive navigation of the currently displayed poster. This approach offers a high degree of control by a centralized management team, for example, over poster displays occurring at branch offices. A local database implementation of the Playlist, on the other hand, may offer significant advantages over centralized database implementations, in some embodiments, in terms of dealing with network traffic. Finally, the Playlist could be implemented using flat files, which have the advantage of being easily implemented and maintained. This file can be served up dynamically by a centralized database or permanently resident on the web server.

In some embodiments, Interactive Posters may be implemented as web-based content, as is known in the art. In some embodiments, the display images and supporting content comprising a particular Interactive Poster is a mixture of locally stored and remotely accessible information. Thus a particular Interactive Poster can draw on information stored in remote databases and can access remote services, via, for example the Internet or company intranets. In some embodiments, Interactive Posters are customized for geographic and/or demographic requirements, and may include language specific versions. Interactive Posters may also be customized for time considerations, such as for the time of day, the week, the month and/or the year. In some embodiments, particular Interactive Posters will provide customers with direct access to the Internet. In these embodiments, blocking and filtering techniques, as are known in the art, may be employed to prevent the display of objectionable material. Pending U.S. patent application Ser. No. 09/925,972, entitled "Method and Apparatus for Conducting Transactions on an Automated Teller Machine," which is owned by the assignee of the present invention and is hereby incorporated by reference, discloses various systems and methods for selecting and sequencing ads based on factors such as customer profiles, market profiles, bank card profiles and ATM (automatic teller machine) profiles.

In some embodiments of the present invention, the invention is initialized by a Start-Up Sequence. Following the Start-Up Sequence, the invention enters Poster Display Mode. During Poster Display Mode, the invention generates Interactive Posters in accordance with a Playlist. While in Poster Display Mode, a customer may initiate interaction with the Interactive Poster being currently displayed by providing an appropriate indication to an Input Device. On receiving such an indication, the invention enters User Interaction Mode. When the User Interaction Mode is exited, the invention returns to Poster Display Mode.

A detailed example of the Start-Up Sequence for one embodiment of the present invention is provided as follows:

1. Software starts and the Group Display Device is placed in portrait mode.
2. A browser starts, a browser child window is created, and a Poster Display Process begins executing in the child window.
3. The child window is set to fill the entire screen of the Group Display Device and all visible indications that a browser is running are eliminated.
4. The child window is made visible on the Group Display Device.
5. The Poster Display Process enters Poster Display Mode.

Figure 3:
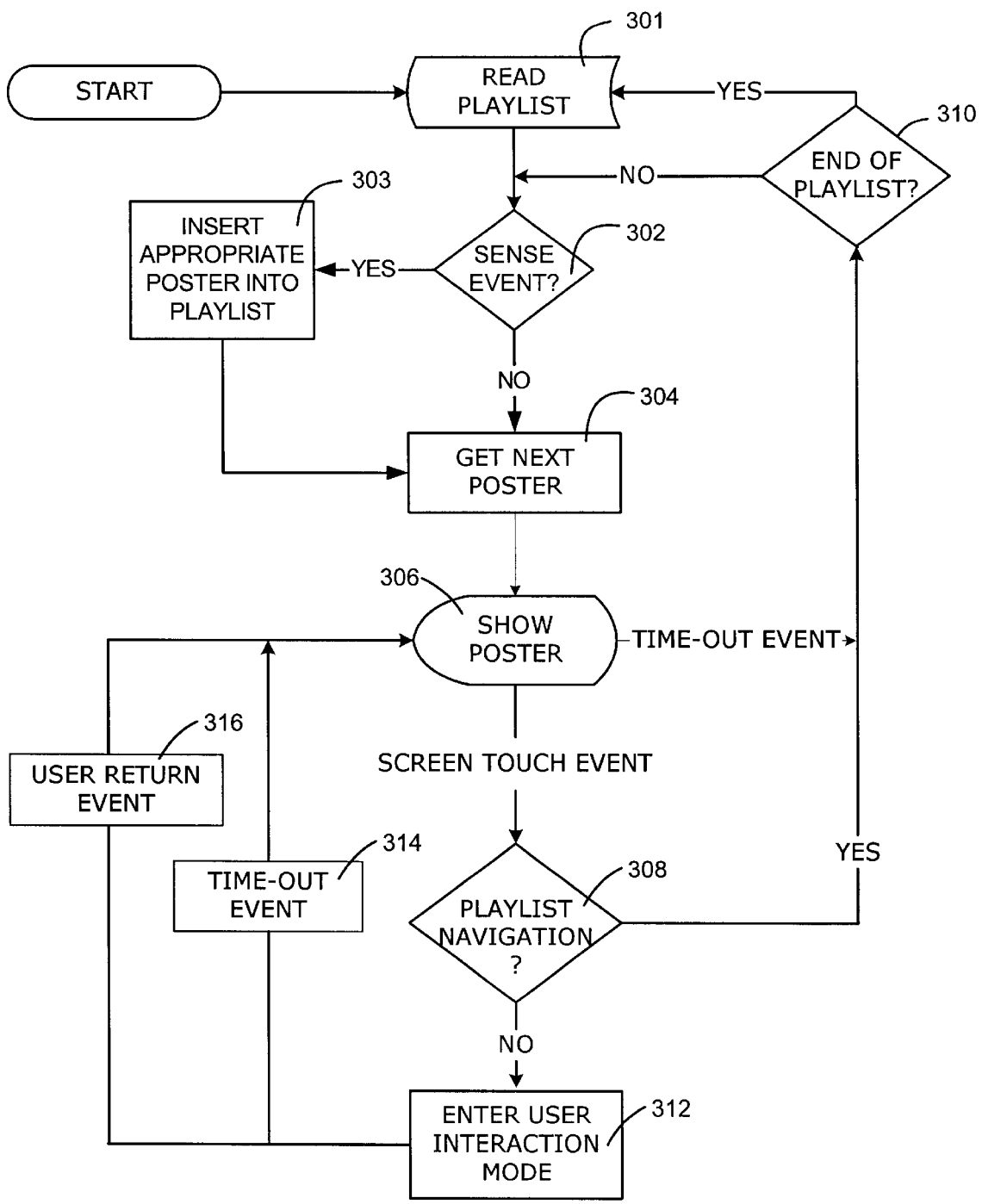
FIG. 3 contains a flow diagram illustrating the steps performed by an embodiment of the present invention operating in a Poster Display Mode.

FIG. 3 contains a flow diagram illustrating the steps performed by an embodiment of the present invention operating in Poster Display Mode. The Playlist referenced in FIG. 3 is, in some embodiments, a javascript file comprising pointers (for example, Universal Resource Locators (URLs) or file names) to each of the Interactive Posters to be generated, an optional link to a supporting file for each Interactive Poster, and a display duration for each Interactive Poster.

With reference to FIG. 3, Poster Display Mode cycles through the Playlist, displaying each Interactive Poster for its predefined duration. A customer can step forward or backward through the Playlist using, for example, one or more of the virtual control buttons described below with reference to FIG. 4. If there is a supporting file for the Interactive Poster being displayed, then a virtual control button (e.g., Touch to Learn More) may be displayed and will allow the information in the supporting file to be accessed. In some embodiments, when a supporting file is available for the Interactive Poster being displayed, then the entire Poster Display Area of that Interactive Poster will be activated as a touch sensitive button and will operate in the same manner as the Touch to Learn More virtual control button. In addition, specific areas of the Interactive Poster being displayed may have their own specific links. For example one graphic may provide a link to a platinum VISA® card while another may provide a link to a gold VISA® card. The Poster Display Process enters User Interaction Mode when a supporting file is accessed. When the entire Playlist has been displayed, the Playlist file is re-read and the Poster Display Mode again cycles through the Playlist from the beginning. In some embodiments, re-reading the Playlist permits the Playlist file to be dynamically updated. In some embodiments, the HTML source code may be re-read at the end of the play cycle, which allows the look and feel of the system and the core functions to be dynamically updated.

A more detailed description of the steps that may be performed by an embodiment of the present invention operating in Poster Display Mode, as illustrated in FIG. 3, is now provided. In this example, the mode of operation is changed from Poster Display Mode to User Interaction Mode when the screen is touched. It should be apparent, however, that the system may beneficially be configured to change modes based on other methods of obtaining user input, such as activation of a magnetic stripe reader, mouse, a keyboard, a button or a motion detector coupled to the system. The system could also be configured to change modes in response to activation of a Customer Identification Device, such as a Remote Identification Sensing Device.

Beginning with step 301, the system reads the Playlist to identify a group and/or sequence of Interactive Posters to display next. In the embodiment shown in FIG. 3, the system is configured to change the Playlist based on the system's recognition that a particular customer is present. This situation might occur, for example, when a particular customer enters a bank and is recognized by a Customer Identification Device, a Customer Biometrics Sensing Device, or both. Thus, in step 302, the system determines whether such a sense event has occurred. If the answer is "Yes," then the system, at step 303, inserts an appropriate poster, i.e., a poster specifically targeted to that customer, into the Playlist before proceeding to step 304, where the next Poster in the Playlist is retrieved. If the answer is "NO," then processing continues at step 304 without inserting any new posters into the Playlist.

Notably, the system may be further configured to change the Playlist based on personal information received from the customer contemporaneously with activation of a Customer Identification Device, i.e., during the course of the customer's interaction with various employees and departments within the business where the system is in operation. Suppose, for example, a customer enters a bank where an interactive advertising system configured in accordance with the present invention is operating. Suppose further that the customer engages in one or more interactions with bank tellers or other employees of the bank which causes the bank tellers or employees to enter into the computer system personal information about the customer, such as the customer's interest in setting up a college savings or retirement plan, for instance. The system could be configured to respond to the newly acquired personal information by changing the contents of the Playlist to include Interactive Posters concerning the college savings or retirement plans offered by the bank.

Continuing at step 304, the system retrieves the next Interactive Poster in the group or sequence, preferably from a local or remote memory storage area containing a plurality of Interactive Posters. In step 306, the Interactive Poster is displayed on the Group Display Device for a specified length of time. If the specified length of time elapses without the screen being touched, a timeout occurs and the system then determines, in step 310, whether all of the Interactive Posters in the Playlist have been displayed. If so, then control passes to step 301 again, where the system retrieves and reads a new Playlist, or reads the old Playlist again. The old Playlist may be read again to verify, for example, that the current Playlist, or the contents of the current Playlist, have not been rendered inapplicable due to other factors, such as the time of day, the installation of new Interactive Posters, or activation of a Customer Identification Device by a new customer entering the vicinity of the system. If, on the other hand, the old Playlist is still applicable, then processing continues at steps 304 and 306, where the next Interactive Poster in the Playlist is retrieved and displayed.

If the screen is touched while an Interactive Poster is being displayed, the system first determines, in step 308, whether the touch activated one of the Playlist navigation controls. If so, then control passes again to step 310, where the system determines whether there are more Interactive Posters to be displayed from the Playlist, and responds accordingly. If, on the other hand, the touch did not activate one of the Playlist navigation controls, then the system enters User Interaction Mode (see step 312), which is described in more detail below with reference to FIG. 7. In a preferred embodiment, the system will stay in User Interaction Mode until a return event or a time out event occurs (illustrated in FIG. 3 at steps 314 and 316). If such an event does occur, then processing returns to step 306, where the next Interactive Poster is displayed.

Figures 4A, 4B:
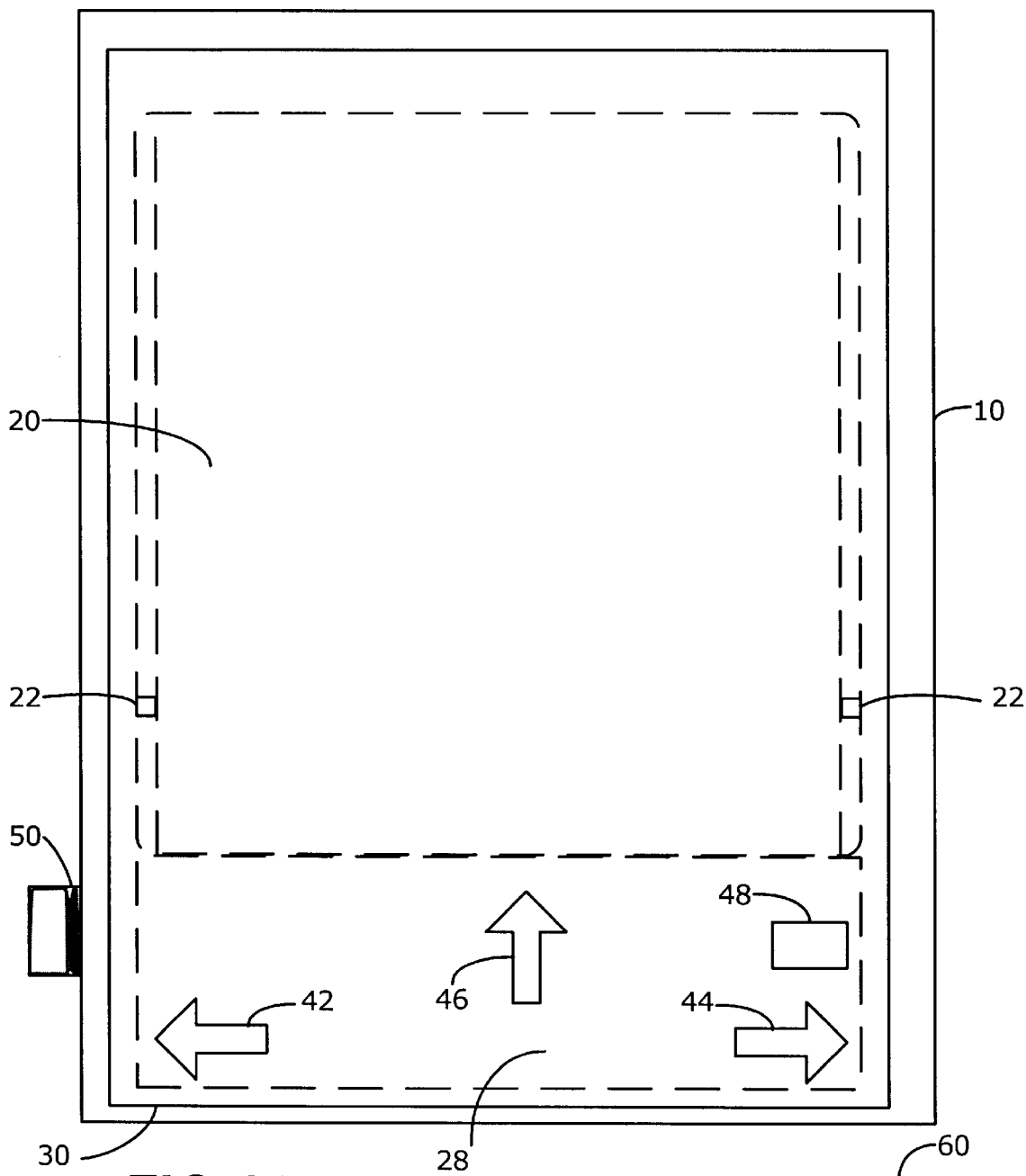
FIGS. 4A and 4B are diagrams of some embodiments of the present invention that comprise a card stripe reader.

Continuing the detailed example, FIG. 4B depicts an Interactive Poster being displayed on Group Display Device 10. The Interactive Poster is divided into Poster Display Area 20, which occupies about 75% of the display area of Group Display Device 10, and Control Area 28, which occupies about 25% of the display area. As would be readily apparent to one skilled in the art, other percentages of display areas could be used for the Poster Display Area and the Control Area in this and other embodiments of the present invention, including making the Poster Display Area occupy the entire Group Display Device. Since, in this example and embodiment, Group Display Device 10 includes a touch screen Input Device, Control Area 28 contains virtual, rather than real, control buttons. As depicted in FIG. 4, Control Area 28 contains Virtual Control Button 42 (labeled "Previous Poster," for navigating to the previous Interactive Poster on the Playlist), Virtual Control Button 44 (labeled "Next Poster," for navigating to the next Interactive Poster on the Playlist), Virtual Control Button 46 (labeled "Touch to Learn More," for initiating an interaction with the currently displayed Interactive Poster and causing the Poster Display Process to enter User Interaction Mode), and Virtual Control Button 48 (labeled "Return to Posters," for ending interaction with the currently displayed Interactive Poster and causing the Poster Display Process to enter Poster Display Mode). Virtual Control Button 42 (Previous Poster) and Virtual Control Button 44 (Next Poster) are always displayed when the Poster Display Process is in Poster Display Mode. In a preferred embodiment, the system may be configured so that Virtual Control Button 46 (Touch to Learn More) is only displayed during Poster Display Mode when the currently displayed Interactive Poster has a supporting file (which will generally provide the customer with more detailed information on the subject matter of the Interactive Poster). Similarly, Virtual Control Button 48 (Return to Posters) may be configured to display only during User Interaction Mode, and may be used to terminate User Interaction Mode and return to Poster Display Mode.

In some embodiments, it may be advantageous to use voice recognition technology to help the customer navigate and control the order of Interactive Posters displayed on the Group Display Device. Thus, the system may be configured, for example, to show the next Interactive Poster when the customer says, "NEXT," or the previous Interactive Poster when the customer says, "BACK." The system may also be configured to show Interactive Posters containing more detailed information when the customer indicates an interest in the product or service by uttering the word "MORE." In a preferred embodiment, natural language processing may be used to recognize and process commands based on one or more words recognized within a natural language utterance. Thus, instead of using simple single words for navigation, such as "Next" or "Back," the user could use phrases such as, "Tell me what my checking account balance is," or "Can you tell me how much money I have in my checking account," both of which would invoke the same checking account balance inquiry transaction on the Group Display Device. On the other hand' if the user said, "Tell me about how I can get a home mortgage loan," a home mortgage loan Interactive Poster would be displayed. These recognized words are typically grouped together to form a transaction request with a subject, qualifiers and action.

Figure 7:
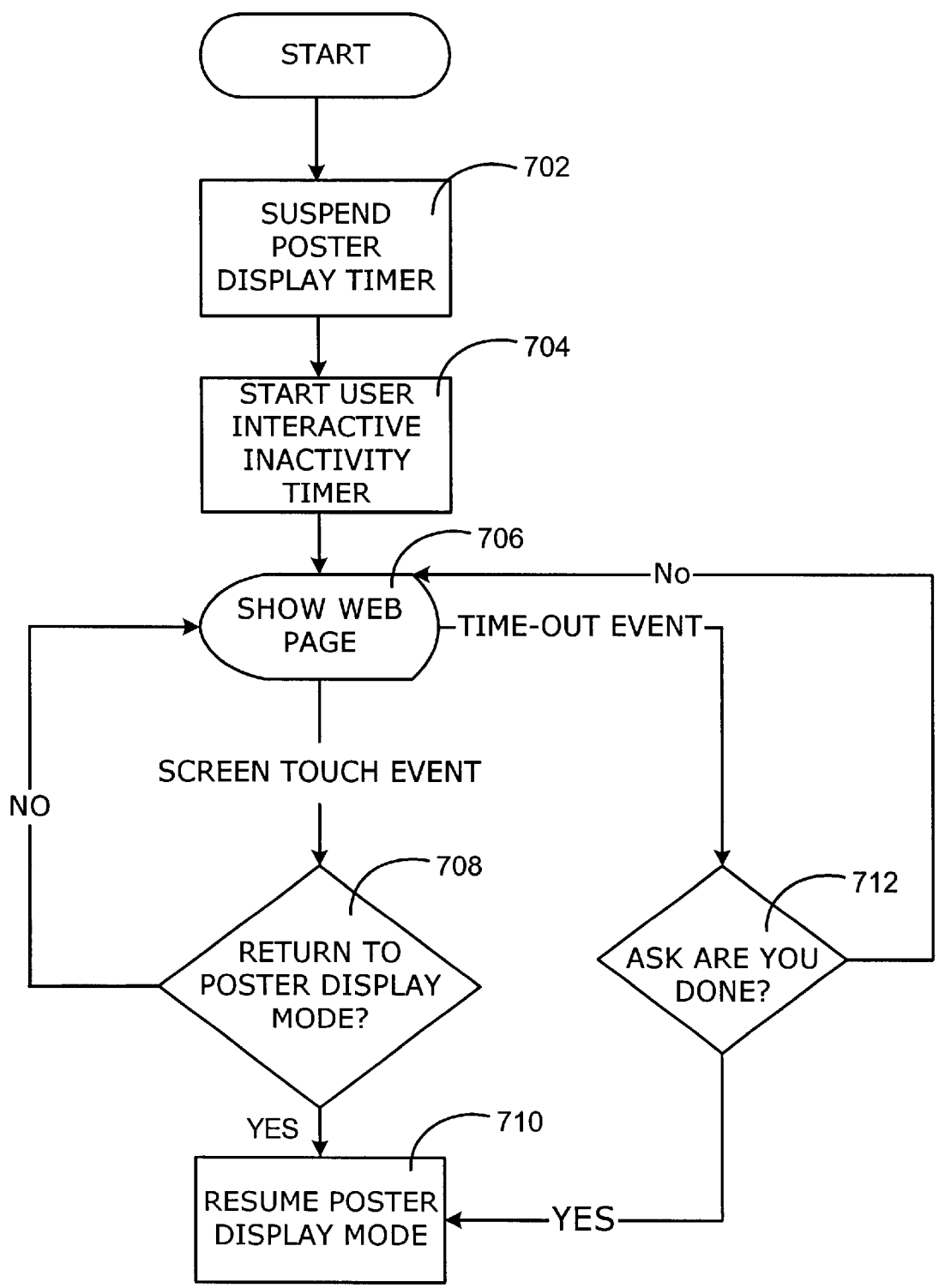
FIG. 7 contains a flow diagram illustrating the steps performed by an embodiment of the present invention operating in User Interaction Mode.

Continuing the detailed example, FIG. 7 contains a flow diagram illustrating the steps performed by an embodiment of the present invention operating in User Interaction Mode. As depicted in FIG. 7, when User Interaction Mode is entered, a timer regulating the duration for which each Interactive Poster is displayed is suspended (see step 702). In a preferred embodiment, information from the Interactive Poster's supporting file is displayed in the Poster Display Area, the virtual control buttons for Next Poster, Previous Poster, and Touch to Learn More are disabled or removed from the display, and the virtual control button for Return to Posters is displayed. In the next step, step 704, an inactivity timer is started so that, if nothing on the Interactive Poster is touched for a predetermined length of time, then the system automatically exits User Interaction Mode and returns to Poster Display Mode.

When the system is operating in User Interaction Mode, the Interactive Poster may be configured to function like a World Wide Web page. The Interactive Posters may include, for example, words, pictures or areas of the page that have been configured as hypertext links, which, when activated, selected or clicked, may cause the system to display an order form or more detailed product information, for instance. Returning to FIG. 7, a web page is displayed to the user in step 706. If the screen is touched while the web page is being displayed, then, in step 708, the system determines whether the touch was meant to cause the system to exit User Interaction Mode and return to Poster Display Mode. If so, processing continues at step 710, where the system resumes Poster Display Mode. If not, then processing returns to step 706, where the next web page is shown to the user. If a web page is shown and the screen is not touched for a predetermined time period, a timeout event occurs and the system asks the user whether he is done (see step 712). If the user answers yes, or provides no answer, then processing continues at step 710 again, where operation of the system switches to Poster Display Mode. If the user says no, then processing again returns to step 706, where the next web page is displayed.

Figure 8A:
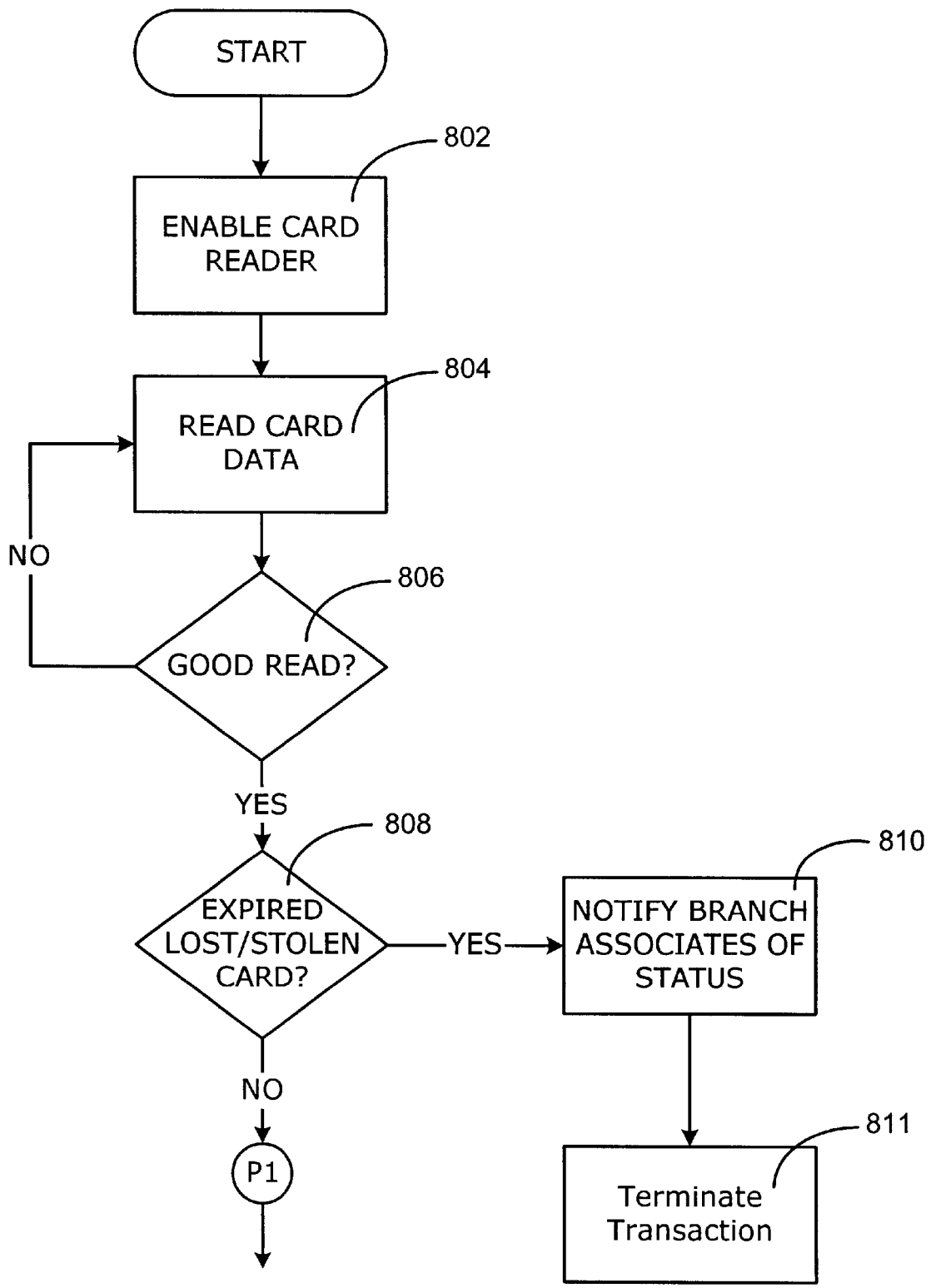
FIGS. 8A and 8B contain a flow diagram illustrating the steps performed by an embodiment of the present invention comprising a credit card processing system.

Continuing the detailed example, FIG. 8A contains a flow diagram illustrating the steps performed by an embodiment of the present invention that includes card processing for magnetic stripe cards and/or smart cards. Certain fulfillment request pages, accessed by a customer during User Interaction Mode, may request the customer to provide customer identification information through the use of a Customer Identification Device such as a magnetic stripe reader. When, for example, an existing customer requests a product, further information, or personal contact, the request may be fulfilled as follows:

1. Customer indicates the type of fulfillment (such as a product, information, or contact) that they want via the touch screen or another Input Device.
2. Customer is asked to swipe their card through a magnetic stripe reader, or another Customer Identification Device is used to identify the customer (which may include obtaining account information).
3. Using the customer identification information, the applicable customer contact information, such as mailing address, phone number, or e-mail address, is obtained from the appropriate system of record.
4. If the customer requested a product, then appropriate systems are checked for existing offers of the requested product or other applicable offers of products. The customer may then be presented with alternative offers.
5. The fulfillment order is placed through the appropriate fulfillment system.

The system's customer recognition capabilities may be embodied in various forms. In the embodiment of FIG. 4, the system incorporates a magnetic stripe reader 50, which can be located on or near the Group Display Device 10. In this embodiment, as shown in FIG. 4B, the user possesses a device 60, such as a bank card, that includes a readable magnetic stripe 62. In other embodiments, the device 60 is embodied as a card that includes a computer chip. The user may swipe the card through the stripe reader 50 that will read the user's information that may be stored on the card. The system may also access information that may be stored on the Distributed Storage Array or on other databases accessible by the system. Such information may have previously been gathered through a prior business contact with that user and stored in the company's databases. For example, the user may have previously indicated on the company's web site that he or she is interested in a home equity loan. This information could have been stored in and made accessible by a customer information management system, such as the one described in co-pending U.S. patent application Ser. No. 10/079,017, entitled, "Customer Information Management Infrastructure and Methods," also owned by the assignee of the present invention, and the entirety of which is incorporated herein by reference. When the user swipes his or her card, the system may know that the user is interested in a home equity loan by accessing the previously stored information about the user. The Processor could then tailor the presentation on the display device 10 to show the bank's home equity loan offerings to the user.

Figure 5:
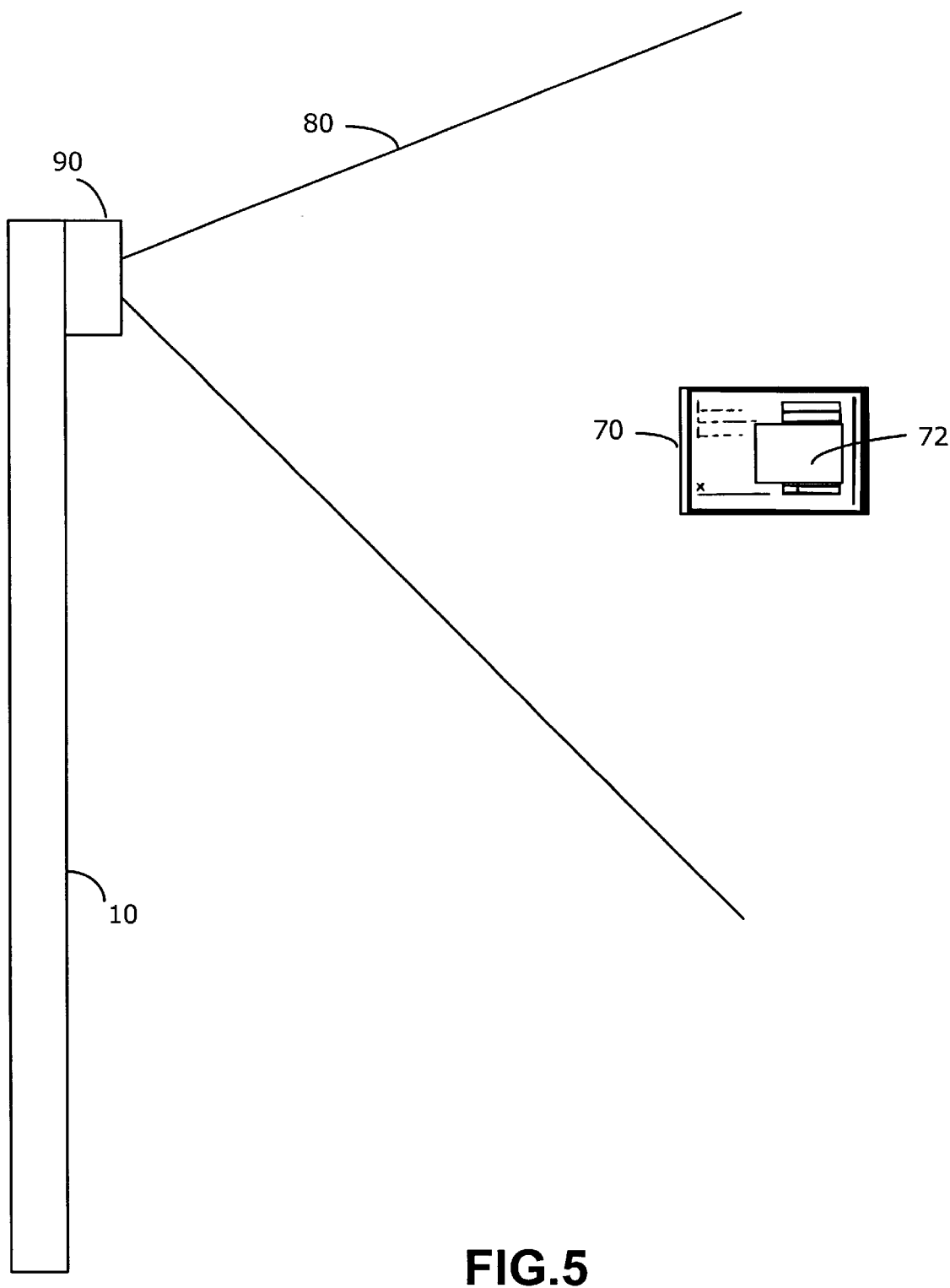
FIG. 5 is a diagram of some embodiments of the present invention that comprise a Remote Identification Sensing Device.

In the embodiment of FIG. 5, the system incorporates a Remote Identification Sensing Device. In this embodiment, the user may possess a card embedded with a transponder that can be remotely activated. For example, the user may possess a bank card 70 that includes a transponder 72 that could be embedded inside the card 70. The system may then incorporate a device 90 that emits a signal 80, such as a radio signal, that is capable of activating the transponder 72. When activated, the transponder 72 may prompt the system to retrieve previously-stored information about the user. As noted above, the user's information may be stored on a storage device, such as the Distributed Storage Array, and/or stored on the bank card itself. The user's information may also be stored in and retrieved from a customer information management infrastructure (CIMI) or a customer relationship manager (CRM) system such as those described in co-pending U.S. patent application No. 10/079,017. The signal emitter can be located near the display device 10 or in the case of a bank lobby, for example, near the entrance to the lobby. The card need only be physically present on the user, such as in the user's pocket or in a handbag. When the signal 80 picks-up the presence of the card, the Processor would, if necessary, change the presentation on the Group Display Device 10 to more closely resemble the interests of the card holder. Although FIG. 5 illustrates an embodiment of the invention wherein the transponder used to identify the user is embedded in a card, those skilled in the art will recognize and appreciate that the same or similar results can be achieved by embedding the transponder in another type of small object carried by the user, such as a key fob, badge, pen or tag.

The system may be configured to deal with the recognition of multiple customers. For example, a first customer may enter the bank lobby and be recognized by the system, which may alter its presentation to more closely match the known interests of the first customer. A second customer may subsequently enter the bank lobby and also be recognized by the system. The system may be configured in many ways known in the art to handle such a situation. For example, the system may continue its presentation for the first customer until such time that it determines that the first customer has not interacted with the device or is no longer near the display device. The system could then alter the presentation to one more suitable for the second customer, assuming he or she has remained near the display area.

Figure 6:
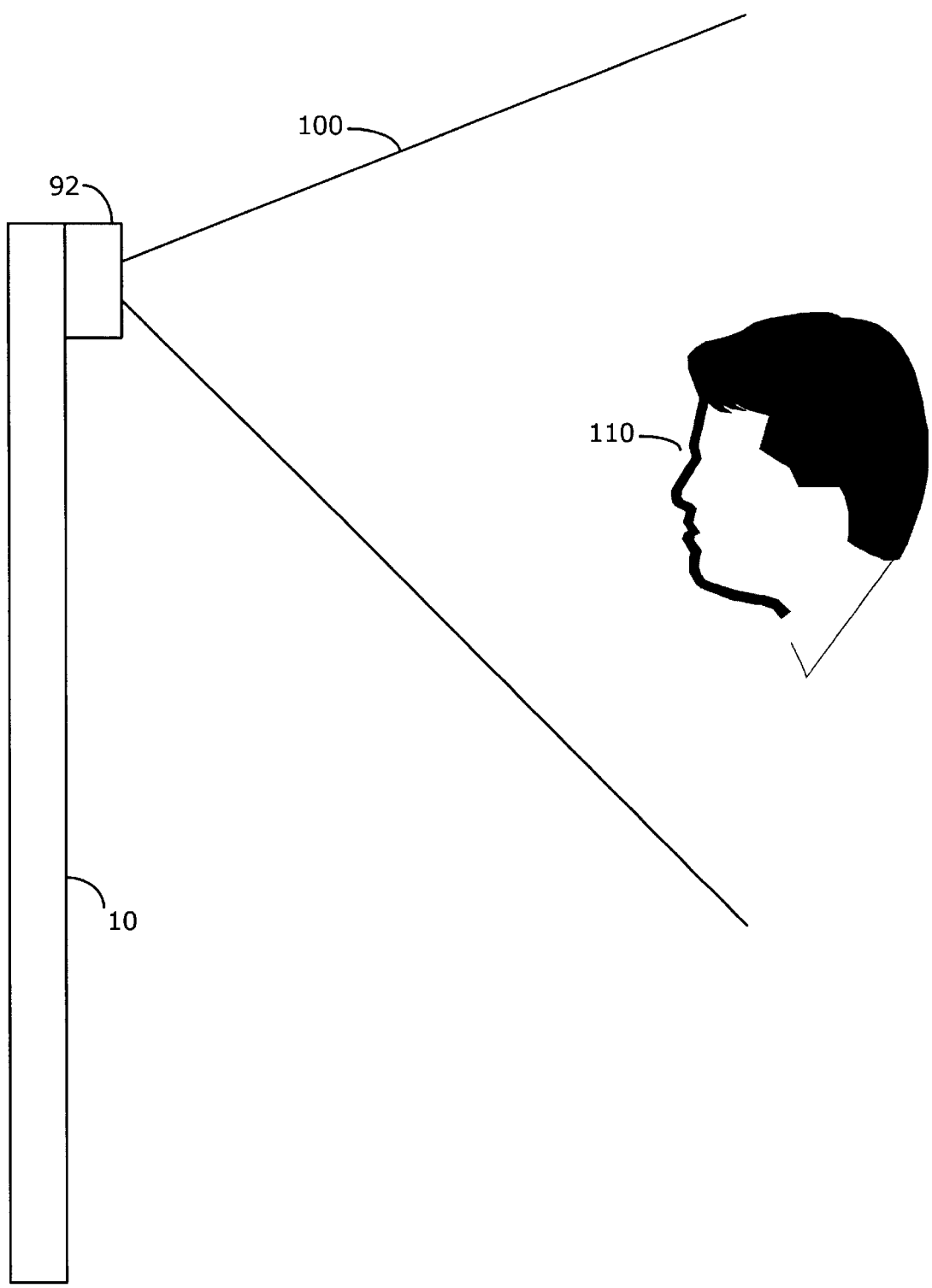
FIG. 6 is a diagram of some embodiments of the present invention that comprise a Customer Biometrics Sensing Device.

In the embodiment of FIG. 6, the system incorporates a Customer Biometrics Sensing Device. Such a device may take several embodiments, including a device that reads the user's facial appearance, voice, iris, retina, or fingerprint. In the embodiment of FIG. 6, the sensing device incorporates face recognition technology. The face recognition capabilities of the system may be embodied similar to that described in U.S. Pat. No. 6,108,437 to Lin, the entirety of which is incorporated herein by reference. In such an embodiment, the system may incorporate a scanner 92 that uses an infrared signal 100 to locate persons that pass in the vicinity of Group Display Device 10. The system could then capture the image of that person's face 110 and extract a signature pattern for the captured image. The system could then compare the extracted signature pattern to a set of stored images that may be located on the Distributed Storage Array or in a customer information management infrastructure (CIMI) or customer relationship manager (CRM) to determine the identity and/or account status of the person. If the identity is confirmed, then the system could alter its current presentation to more closely match the known interests and status of the identified person. The Customer Biometrics Sensing Device may handle the recognition of multiple users in the same manner described above regarding the Remote Identification Sensing Device.

In some embodiments, it may advantageous to enroll a customer in the biometric recognition system before it can be used to recognize and process the physical characteristics of the customer. The biometric enrollment may utilize the same hardware, e.g., Imaging Device and microphone Input Device, used to capture images and user input for the Group Display Device, or a separate enrollment station may be used. Once the biometric information is captured, it may be stored in a customer data store, a local or remote data store, or it may be written to a smart card to be carried by the customer, depending on the requirements of the particular application. Regardless of where the biometric information is stored, it can be retrieved, in a preferred embodiment, during an interaction with the customer for authentication, entitlement and personalization purposes.

The system may also incorporate a Crowd Evaluation Device. In such an embodiment, the system could, for example, make a determination of the number of persons that are near the display area in order to present a display more suitable for multiple viewers. For instance, the system could use the Remote Identification Sensing Device to sense the number of transponders in the area. With this information, the system could roughly determine the number of persons near the display area. In other embodiments, the system uses its biometric sensing capabilities in addition to, or in lieu of, the Remote Identification Sensing Device. Where more than one customer recognition device is employed, the system can be configured with a Program to preclude duplicate counting of the same recognized user.

When a user touches an Interactive Poster displayed, the system switches into User Interaction Mode, where, in a preferred embodiment, five additional controls are displayed in Control Area 28: Print a Copy, Call Me, eMail Me, Mail Me and Get Help.

Print a Copy. When selected, this control will send a copy of a designated document or a designated portion of the Interactive Poster to a Hardcopy Output Device, such as printer 130 shown in FIG. 1. Printed content could comprise the current poster, an alternate "printer friendly" copy of the current poster, an Adobe Acrobat "PDF" file, or any other designated printable form or content. In a preferred embodiment, up-to-the-minute printable marketing content, such as documents containing current market rates or other information, may be maintained at a central site and then sent to the Hardcopy Output Device in response to a user's selection of the Print a Copy control.

Call Me. When this control is selected, a request for a call to the user is forwarded to the appropriate entity. In a preferred embodiment, the user's call back preferences (e.g, telephone numbers, time of day the user prefers to be called, etc.) are retrieved from a customer information database based on information supplied by a Customer Identification Device. The Customer Identification Device may comprise a magnetic stripe card reader or a computer chip card reader. Radio frequency identification devices ("RFID"), biometric devices, or other identification technology, or any combination of these, may also be used. If the user has registered call back options, then these will be used. Otherwise, the user will be prompted to provide these preferences or to see an on-site employee to have the preferences entered into the system.

eMail Me. When selected, this control will send a request to the appropriate entity to send an email containing relevant content to the user. In a preferred embodiment, the user's email contact preferences (i.e., email addresses) are retrieved from a customer information database based on information supplied by a Customer Identification Device. If the user has registered email preferences, then these preferences will be used. Otherwise, the user may be prompted to provide these preferences or to see an on-site employee to have the preferences entered into the system.

Mail Me. When selected, this control will send a request to the appropriate entity to mail the appropriate content to the user. In a preferred embodiment, the user's, mail preferences (e.g, street address, city, state and zipcode) are retrieved from a customer information database based on information supplied by a Customer Identification Device. If the user has registered mail options, then these will be used. Otherwise, the user may be prompted to provide these preferences or to see an on-site employee to have the preferences entered into the system.

Get Help. When selected, this control may initiate any number of different actions, including the action of providing immediate assistance for the customer. This assistance can take many forms, including, for example, a video and audio call to a remote call center, an audio-only call, a network message requesting assistance from branch personnel, or even the appearance and helpful suggestions of an artificial intelligence-backed computerized help agent.

In User Interaction Mode, the help facility may also be activated when the user presses help function button 39A (FIG. 2) which may exist within the Control Area 28. For instance, when the invention is used in the lobby of a bank branch, this button when pressed can summon help from within the branch using a pop-up window messaging service on the screen of a teller within the branch. This feature may be embodied as the messaging system incorporated into such software as NetMeeting available from Microsoft Corporation, One Microsoft Way, Redmond, Wash. 98052. The system may also incorporate a remote help request button 39B. The user's request for help could be routed as an H.323 standard videoconference or voice over Internet Protocol (VoIP) or POTS (Plain Old Telephone Service) call to a customer service center. To enable this feature, the system could include a video conferencing camera 120, as shown in FIG. 2, on or near the Group Display Device with similar capabilities at the customer service center. Alternatively, the video feature may be omitted in favor of a simpler and less expensive voice and/or text connection between the user and the customer service center.

The user controls described above are intended to illustrate but a few examples of the kinds of controls that may be implemented in various embodiments of the present invention. It should be apparent to one of skill in the art that the system may be configured to display an almost unlimited number of controls in addition to or instead of the five controls described herein. In a preferred embodiment, these controls may be turned off or deactivated when the system is in Poster Display Mode. But when user interaction switches the system from Poster Display Mode to User Interaction Mode, these controls may be turned on in any combination, depending on the settings selected for the currently displayed Interactive Poster.

In a preferred embodiment, the video camera 120 can be activated as part of the Get Help function, as described above. But it could also be used, in a preferred embodiment, to capture pictures of the user that may be required in certain situations. For example, many banks and credit card companies now place pictures of the cardholder on the card for photo ATM or credit cards, security or other purposes. This picture can conveniently be taken at the display device using the video camera 120. When used to capture an image for a photo ATM or credit card, customers would have the ability to take pictures repeatedly until they receive a photograph of themselves that they really like. In a preferred embodiment, the best photograph could then be sent directly to the card printer to generate a photo card on the spot.

Figure 8B:
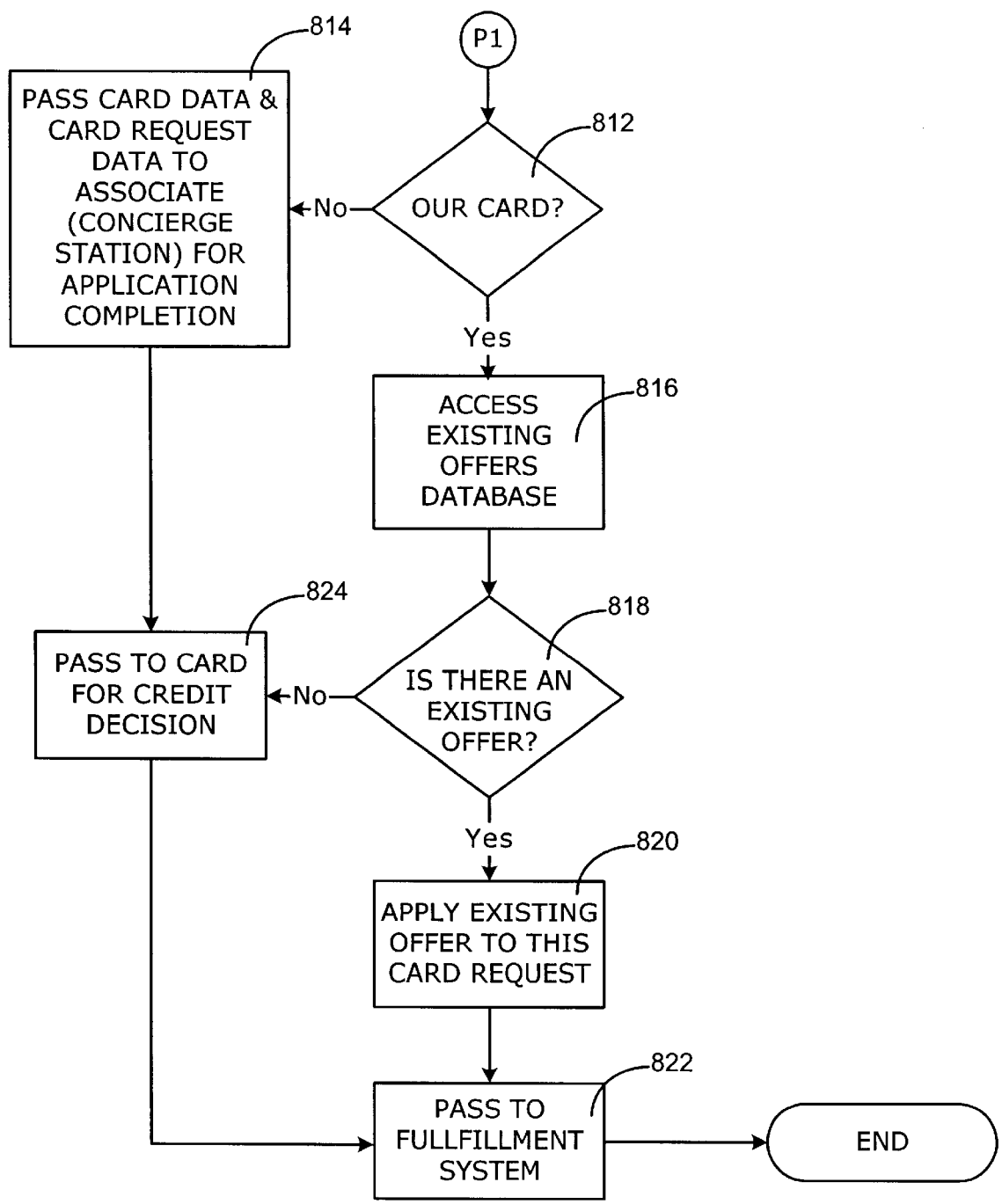

A user's request for a credit card may also be tied to either of the customer recognition capabilities described above. Such an embodiment may be configured, for example, as in the flow chart of FIG. 8, using the magnetic stripe card reader of FIGS. 4 and 4B. Beginning with step 802 in FIG. 8, a card reader is enabled. Next, in step 804, the system reads the data stored on a card. Then, in step 806, the system may determine whether the card read was successful. If the card read was not successful, then processing would return to step 804 to attempt another card read. If the card read was successful, the system may then check to see if the card being used has expired or been reported as lost or stolen, step 808. If the card is lost or stolen, then the situation may be reported to an appropriate branch associate, such as in step 810 of FIG. 8, upon which the transaction would be terminated (see step 811). Returning to step 808, if the card is not expired or registered as lost or stolen, then control would pass to step 812 in FIG. 8B by way of flowchart connector P1, where the system may check to see if the customer is using a card, for example, from the banking institution operating the display device. If the customer is using a third-party card, then the system could refer the applicant to a banking associate within that banking institution, as illustrated in FIG. 8B at step 814, to complete a credit application. Alternatively, the credit application can be processed at the Group Display Device 10 through a variety of manual and/or automatic means. For example, the system may employ a virtual keyboard for manual entry of credit information by the applicant. The application may also be processed automatically through access to information stored on an existing card with a readable computer chip or stored on a card stripe system, as shown in FIGS. 4A and 4B.

Returning to step 812, if it is determined that the user is an existing bank customer with no current credit offer on file, then the system may access a database of existing offers, step 816. At step 818, the system determines whether there is an appropriate credit offer on file for the customer. If there is, then, in step 820, the system will apply the existing offer to the customer's card request. If there is no existing offer on file for the customer, then a decision must be made, possibly by another business entity, about whether to grant credit to this particular customer, as illustrated by step 824. Finally, in step 822, information about the credit card request is passed to the appropriate processing system within the bank, such as may exist on an accessible mainframe application, to setup the customers credit account, and generate and deliver the credit card to that customer. Card production and delivery to the customer may be accomplished at the bank or through mail delivery to the customer's home.

The system may also be adapted to handle a user's request for information via mail and/or telephone. For example, a customer may view an Interactive Poster and want further information relating to that Interactive Poster. In such a case, Control Area 28, as depicted in FIG. 2, can provide means for the customer to select a method for fulfillment, such as by mail, or by receiving a call from a customer representative. The request can also be fulfilled using customer information, such as address or telephone number, supplied by the user at the display device location, or alternatively, using the customer recognition capabilities described above.

As noted, the customer recognition capabilities may be coupled to contact and preference information (such as mailing addresses, phone numbers and e-mail addresses) already stored in the company's databases or legacy systems. The coupling of such customer recognition capabilities with contact and preference information allows the system to generate a customer order (comprising, for example, the product or service requested and the customer's name, mailing address, telephone number, etc.) based on a single action by the customer, i.e., a single swipe of the customer's bank or ATM card through the card reader attached to the Group Display Device, or a single touch of a button displayed on a control panel. The customer recognition capabilities of the present invention also may be used to identify accounts owned by the recognized customer (i.e., checking, savings, credit card, debit card, home equity lines, etc) that have an inherent payment capability normally associated with these types of accounts. If the account identified by the customer recognition capability is not a payment capable account, then the system can be configured to provide a link or an association to other customer accounts that do have a payment capability. Accordingly, the system can generate a complete executable order, including the requested product or service, the customer's name, mailing address, telephone numbers and payment method, all based on a single action from the user (i.e., a card swipe or a button selection) indicating that he or she wishes to purchase the product or service being displayed.

The system may also be configured to provide copies of printed information for the user. For example, referring back to FIG. 1, the system may include a Hardcopy Output Device, such as a printer 130, that can be used to download and print information available from the display screen. This would enable an on-demand document service. The printer may include color capability in order for the user to print aesthetically pleasing paper brochures on demand. Such a service would allow the company to have the most updated materials available for the user.

The various interactions between the user and the system may be recorded and stored in order to customize the displayed material whenever the system recognizes the user in the future. For example, the system may keep a record of the transactions on the system for a specific user and/or for a particular display location. This information can be stored on the Distributed Storage Array and analyzed to determine any preferences. This information can then be used to tailor future poster presentations for a user or for the particular location.

Figure 9:
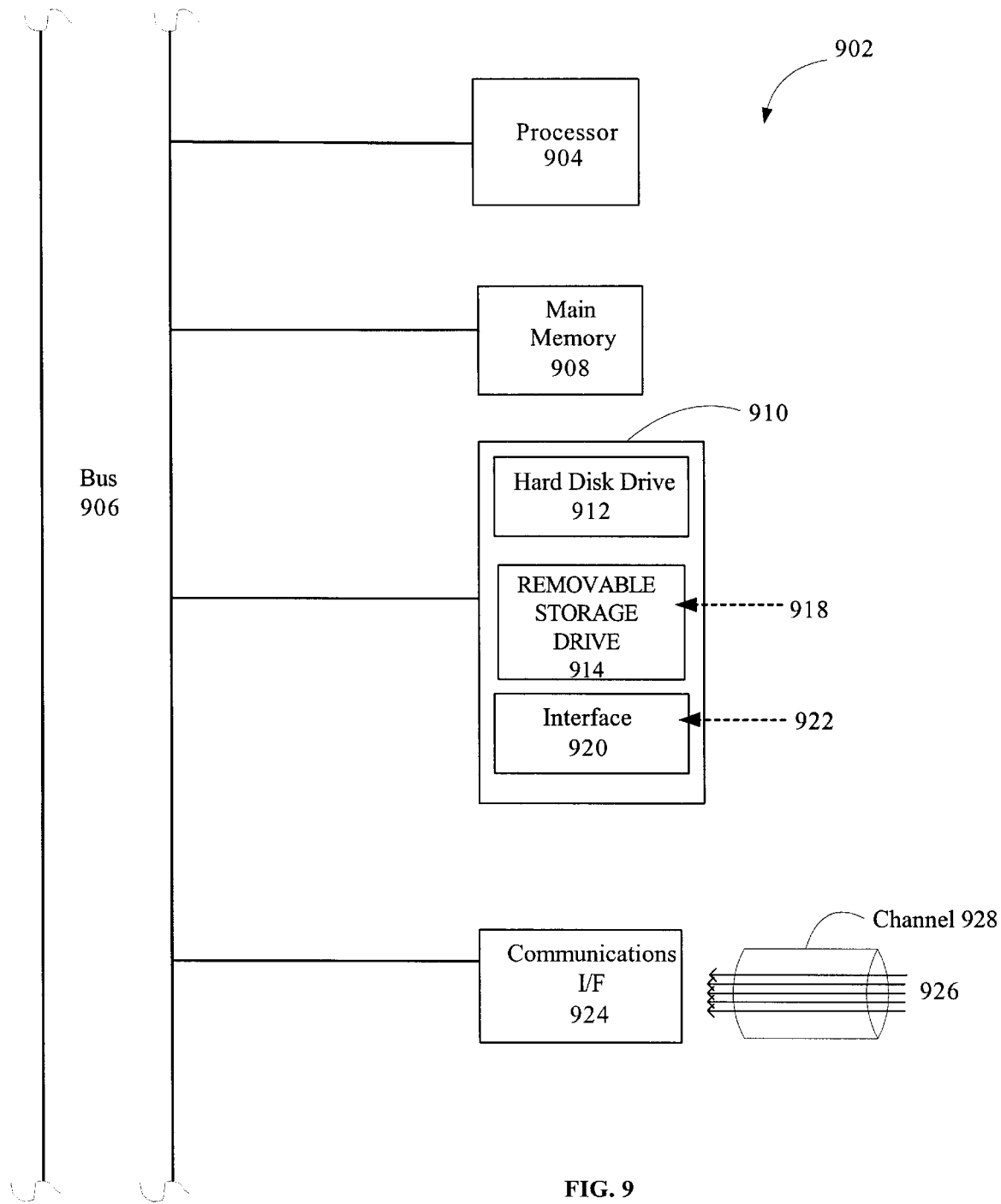
FIG. 9 is a block diagram of a computer system as may be used to implement an embodiment of the invention.

With reference now to FIG. 9, a description of a computer system suitable for use with an embodiment of the present invention is provided. The Computer System 902 includes one or more processors, such as a Processor 904. Processor 904 is connected to a communication Bus 906. Various software embodiments are described in terms of this exemplary computer system. After reading this description, it will become apparent to a person skilled in the relevant art how to implement the invention using other computer systems and/or computer architectures.

The Computer System 902 also includes a Main Memory 908, preferably random access memory (RAM), and can also include a secondary memory 910. The secondary memory 910 can include, for example, a Hard Disk Drive 912 and/or a Removable Storage Drive 914, representing a floppy disk drive, a magnetic tape drive, an optical disk drive, etc. The Removable Storage Drive 914 reads from and/or writes to a Removable Storage Unit 918 in a well-known manner. The Removable Storage Unit 918, represents a floppy disk, magnetic tape, optical disk, etc. which is read by and written to by the Removable Storage Drive 914. As will be appreciated, the Removable Storage Unit 918 includes a computer usable storage medium having stored therein computer software and/or data.

In alternative embodiments, the Secondary Memory 910 may include other similar means for allowing computer programs or other instructions to be loaded into the Computer System 902. Such means can include, for example, a Removable Storage Unit 922 and an Interface 920. Examples of such can include a program cartridge and cartridge interface (such as that found in video game devices), a removable memory chip (such as an EPROM, or PROM) and associated socket, and other Removable Storage Units 922 and Interfaces 920 which allow software and data to be transferred from the Removable Storage Unit 922 to the Computer System 902.

The Computer System 902 can also include a Communications Interface 924. The Communications Interface 924 allows software and data to be transferred between the Computer System 902 and external devices. Examples of the Communications Interface 924 can include a modem, a network interface (such as an Ethernet card), a communications port, a PCMCIA slot and card, etc. Software and data transferred via the Communications Interface 924 are in the form of signals 926 that can be electronic, electromagnetic, optical or other signals capable of being received by the Communications Interface 924. Signals 926 are provided to Communications Interface 924 via a Channel 928. Channel 928 carries Signals 926 and can be implemented using wire or cable, fiber optics, a phone line, a cellular phone link, an RF link and other communications channels.

In this document, the term "computer-readable storage medium" is used to generally refer to media such as the Removable Storage Device 918, a hard disk installed in Hard Disk Drive 912, and Signals 926. These media are means for providing software and operating instructions to the Computer System 902.

Computer programs (also called computer control logic) are stored in the Main Memory 908 and/or the Secondary Memory 910. Computer programs can also be received via the Communications Interface 924. Such computer programs, when executed, enable the Computer System 902 to perform the features of the present invention as discussed herein. In particular, the computer programs, when executed, enable the Processor 904 to perform the features of the present invention. Accordingly, such computer programs represent controllers of the Computer System 902.

In an embodiment where the invention is implemented using software, the software may be stored in a computer-readable storage medium and loaded into the Computer System 902 using the Removable Storage Drive 914, the Hard Drive 912 or the Communications Interface 924. The control logic (software), when executed by the Processor 904, causes the Processor 904 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

Figure 10C:
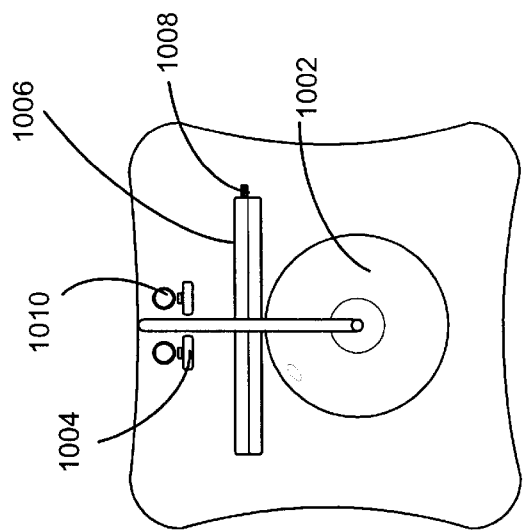
FIGS. 10A, 10B and 10C depict the front, side and top views of an embodiment of the present invention.
Figure 10B:
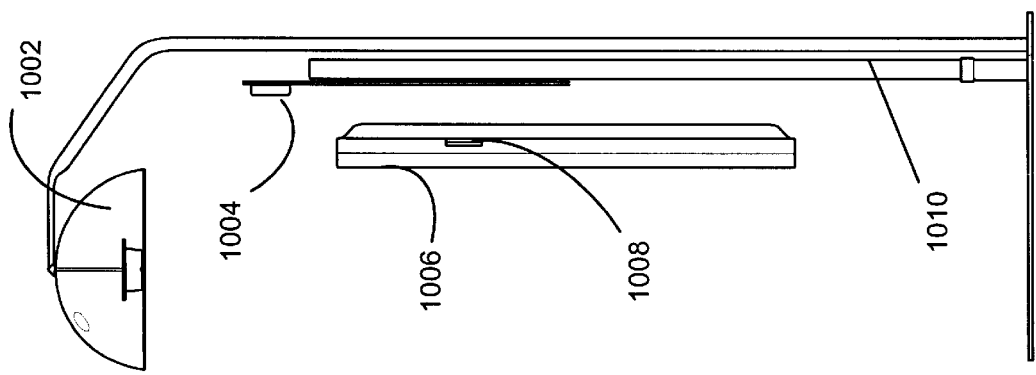
Figure 10A:
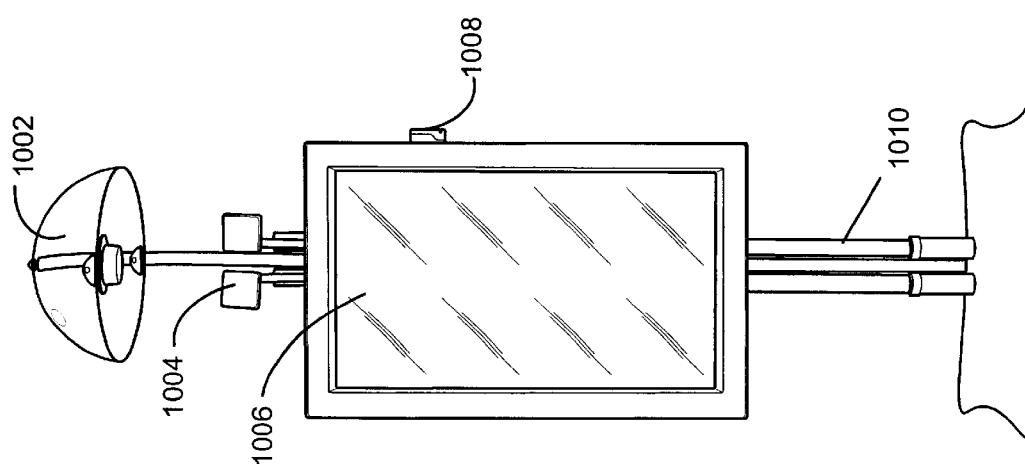

FIGS. 10A, 10B and 10C show the front, side and top views of an example of a public announcement or public advertising system configured in accordance with an embodiment of the present invention. As illustrated in FIGS. 10A, 10B and 10C, this embodiment generally comprises Focused Audio Device 1002, Remote Identification Sensing Devices 1004, Group Display Device 1006 and Magnetic Stripe Reader 1008. In this embodiment, Focused Audio Device 1002, Remote Identification Sensing Devices 1004, Group Display Device 1006 and Magnetic Stripe Reader 1008 are all supported by Support Stand 1010, which is generally positioned behind the other components in order to provide the most visibility for Group Display Device 1006. However, Focused Audio Device 1002, Remote Identification Sensing Devices 1004, Group Display Device 1006 and Magnetic Stripe Reader 1008 may be supported by a variety of free-standing devices (an example of which is illustrated in FIG. 11), or attached to or suspended from a nearby wall or ceiling.

Figure 11:
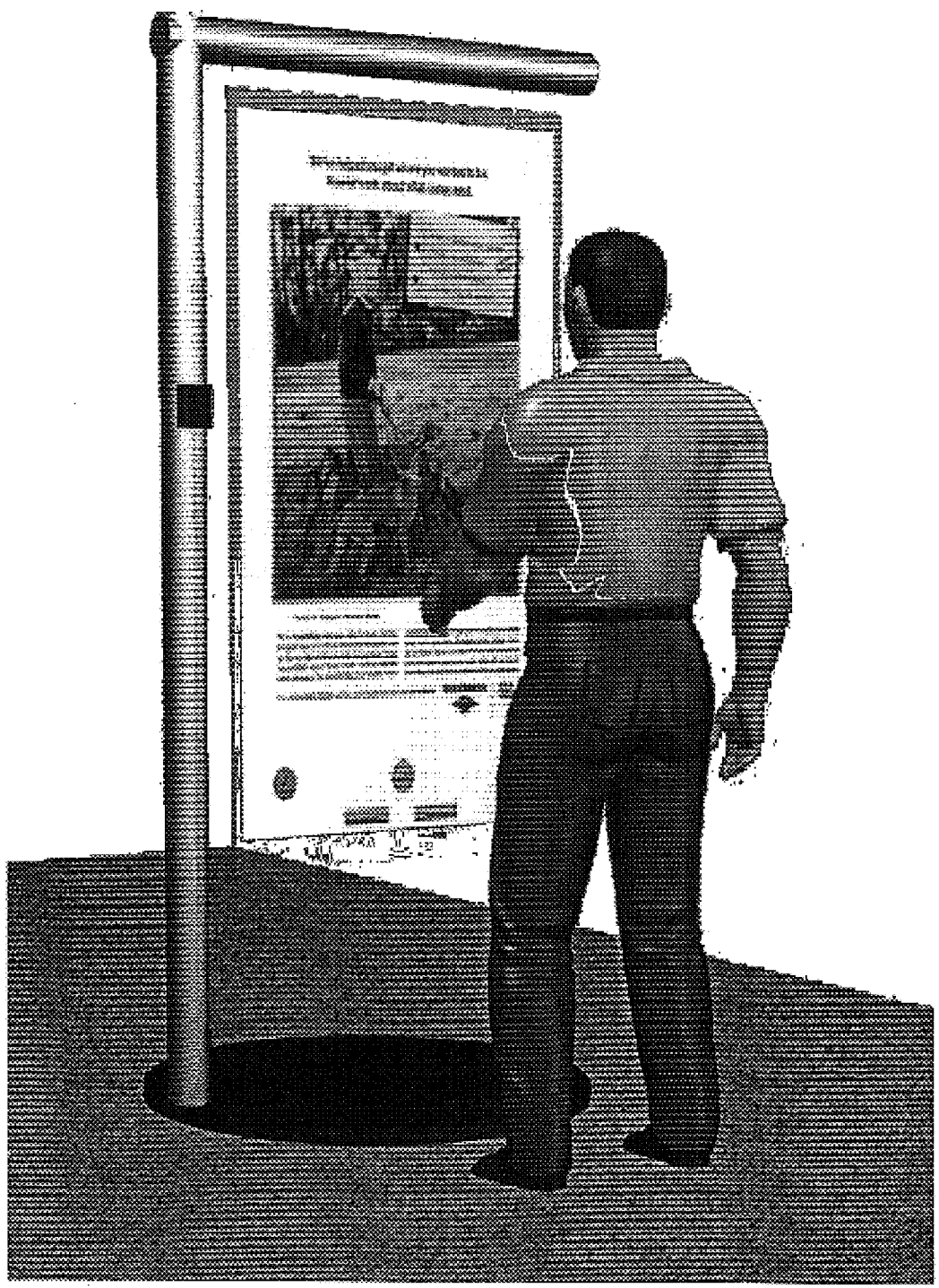
FIG. 11 shows how a user might interact with one embodiment of the present invention.

FIG. 11 illustrates how a user might interact with one embodiment of the present invention.

It should be understood that the preceding is merely a detailed description of some examples and embodiments of this invention and that numerous changes to the disclosed embodiments can be made in accordance with the disclosure herein without departing from the spirit or scope of the invention. The preceding description, therefore, is not meant to limit the scope of the invention. For example, although such devices are not explicitly shown in FIGS. 1, 10A, 10B, 10C and 11, it should be apparent to those skilled in the art that any one of these embodiments, or all of them, may be beneficially modified to include video equipment, such as a video or still image camera, as well as additional audio equipment, without departing from the spirit or scope of the invention.

We claim:

1. An interactive advertising system, comprising;
   a Group Display Device;
   a Distributed Storage Array comprising at least one Storage Device;
   a Distributed Processor Array coupled to the Distributed Storage Array, the Distributed Processor Array comprising at least one Processor, and the Distributed Storage Array storing a Program for controlling the Distributed Processor Array; and
   a Remote Identification Sensing Device; wherein the Remote Identification Sensing Device comprises a transceiver configured to communicate with a transponder using electromagnetic transmission signals, whereby the Remote Identification Sensing Device is capable of communicating with the transponder without direct physical contact between the transceiver and the transponder:
   wherein the Distributed Processor Array is operative with the Program to generate at least one Interactive Poster on the Group Display Device; and to configure the at least one Interactive Poster responsive to the Remote Identification Sensing Device.

2. The interactive advertising system of claim 1, wherein the at least one Interactive Poster is contained in a Playlist, and wherein the at least one Interactive Poster is generated in response to the Playlist.

3. The interactive advertising system of claim 2, wherein the Playlist comprises display parameters for the at least one Interactive Poster.

4. The interactive advertising system of claim 1, wherein the Distributed Processor Array is flanker operative with the Program to collect statistics responsive to the generation of the at least one Interactive Poster.

5. The interactive advertising system of claim 1, wherein the Distributed Processor Array is further operative with the Program to collect statistics responsive to the configuration of the at least one Interactive Poster.

6. The interactive advertising system of claim 1, wherein the Group Display Device comprises an Input Device and wherein the Input Device is responsive to touch.

7. The interactive advertising system of claim 6, wherein the Input Device is responsive to a voice.

8. The interactive advertising system of claim 7, wherein the Input Device is configured to respond only to a voice containing a recognized voice pattern.

9. The interactive advertising system of claim 6, wherein the Input Device is responsive to motion.

10. The interactive advertising system of claim 1, wherein the Group Display Device further comprises a Focused Audio Device.

11. The interactive advertising system of claim 1, further comprising a Customer Identification Device; and wherein the Distributed Processor Array generates the at least one Interactive Poster on the Group Display Device responsive to the Customer identification Device.

12. The interactive advertising system of claim 11, wherein the Customer Identification Device comprises a magnetic: stripe reader.

13. The interactive advertising system of claim 11, wherein the Customer Identification Device comprises a card having a readable computer chip.

14. The interactive advertising system of claim 11, wherein the Customer Identification device comprises a Customer Biometrics Sensing Device.

15. The interactive advertising system of claim 14, wherein the Customer Biometrics Sensing Device is responsive to a customer's appearance.

16. The interactive advertising system of claim 14, wherein the Customer Biometrics Sensing Device is responsive to a customer's voice.

17. The interactive advertising system of claim 14, wherein the Customer Biometrics Sensing Device is responsive to a customer's iris.

18. The interactive advertising system of claim 14, wherein the Customer Biometrics Sensing Device is responsive to a customer's retina.

19. The interactive advertising system of claim 14, wherein the Customer Biometrics Sensing Device is responsive to a customer's fingerprint.

20. The interactive advertising system of claim 14, wherein the Distributed Processor Array is operative with the Program to store information responsive to the Customer Biometrics Sensing Device.

21. The interactive advertising system of claim 1, wherein the transponder is positioned on a card.

22. The interactive advertising system of claim 1 wherein the transceiver is configured to send and receive wireless signals.

23. The interactive advertising system of claim 22, wherein the transceiver sends and receives wireless signals to and from the transponder thereby uniquely identifying a user.

24. The interactive advertising system of claim 1, wherein the Remote Identification Sensing Device comprises a Crowd Evaluation Device.

25. The interactive advertising system of claim 1, further comprising a Hardcopy Output Device, and wherein the Distributed Processor Array is operative with the Program to provide output information on the Hardcopy Output Device responsive to the at least one Interactive Poster.

26. The interactive advertising system of claim 1, further comprising an Imaging Device.

27. The interactive advertising system of claim 26, wherein the Distributed Processor Array is operative with the Program to store images captured by the Imaging Device.

28. The interactive advertising system of claim 1, further comprising a Video Conferencing System.

29. The interactive advertising system of claim 28, wherein the Distributed Processor Array is operative with the Program to control the Video Conferencing System.

30. The system of claim 1, further comprising:
    an Input Device; and
    a fulfillment device operative to fulfill a fulfillment request inputted into the Input Device.

31. The system of claim 30, wherein the fulfillment request comprises an indication of a type of fulfillment.

32. The system of claim 30, wherein the fulfillment request comprises a request for a product.

33. A method for presenting announcements to a user, comprising:
    providing a Group Display Device, a Remote Identification Sensing Device, wherein the Remote Identification Sensing Device comprises a transceiver configured to Communicate with a transponder using electromagnetic transmission signals, whereby the Remote Identification Sensing Device is capable of communicating with the transponder without direct physical contact between the transceiver and the transponder, a first memory storage area containing a plurality of media elements, and a second memory storage area containing personal information about the user; and
    in response to the activation of the Remote Identification Sensing Device, displaying on the Group Display Device a subset of the plurality of media elements;

wherein the subset of the plurality of media elements displayed on the Group Display Device is determined by reference to the personal information.

34. The method of claim 33, wherein the secondary memory storage area comprises a component of a customer information management infrastructure.

35. The method of claim 33, wherein the secondary memory storage area comprises a component of a customer relationship management system.

36. The method of claim 33, wherein the plurality of media elements comprises advertisements.

37. The interactive advertising system of Claim 33 wherein the transponder is positioned an a card.

38. The method of claim 33, wherein the transceiver is configured to send and receive wireless signals.

39. The method of claim 38, wherein the transceiver sends and receives wireless signals to and from the transponder thereby uniquely identifying the user.

40. The method of claim 33, wherein the Remote Identification Sensing Device comprises a Crowd Evaluation Device.

41. The method of claim 33, further comprising: providing a Customer Biometrics Sensing Device.

42. The method of claim 41, wherein the Customer Biometrics Sensing Device is responsive to a customer's appearance.

43. The method of claim 41, wherein the Customer Biometrics Sensing Device is responsive to a customer's voice.

44. The method of claim 41, wherein the Customer Biometrics Sensing Device is responsive to a customer's iris.

45. The method of claim 41, wherein the Customer Biometrics Sensing Device is responsive to a customer's retina.

46. The method of claim 41, wherein the Customer Biometrics Sensing Device is responsive to a customer's fingerprint.

47. The method of claim 33, wherein the subset of the plurality of media elements displayed on the Group Display Device is responsive to an Input Device.

48. A The method of claim 47, wherein the Input Device comprises a keyboard.

49. The method of claim 47, wherein the Input Device comprises a mouse.

50. The method of claim 47, wherein the Input Device comprises a touch-sensitive interface.

51. The method of claim 47, wherein the input Device comprises a microphone.

52. The method of claim 47, wherein the Input Device comprises a button.

53. The method of claim 33, further comprising ordering the subset prior to the step of displaying the subset on the Group Display Device.

54. The method of claim 33, further comprising providing an Input Device; and
in response to a fulfillment request obtained from the Input Device, fulfilling the fulfillment request.

55. The method of claim 54, wherein the fulfillment request comprises an indication of fulfillment.

56. The method of claim 54, wherein the fulfillment request comprises a request for a product.

57. The method of claim 54, further comprising: prior to fulfilling the fulfillment request, presenting the user with an alternative fulfillment request.

58. A public announcement system, comprising:
means for accessing a plurality of media elements;
means for identifying a user in proximity to the public announcement system, wherein said means for identifying comprises a Remote Identification Sensing Device, wherein the Remote Identification Sensing Device comprises a transceiver configured to communicate with a transponder using electromagnetic transmission signals, whereby the Remote identification Sensing Device is capable of communicating with the transponder without direct physical contact between the transceiver end the transponder; and
means, responsive to the means for identifying, for retrieving personal information about the user and for displaying a subset of the plurality of media elements;
wherein the subset of the plurality of media elements displayed is determined by reference to the personal information.

59. The public announcement system of claim 58, wherein the subset of the plurality of media elements displayed is responsive to an input means.

60. The public announcement system of claim 59, wherein the input means comprises a keyboard.

61. The public announcement system of claim 59, wherein the input means comprises a mouse.

62. The public announcement system of claim 59 wherein the input means comprises a touch-sensitive interface.

63. The public announcement system of claim 59 wherein the input means comprises a microphone.

64. The public announcement system of claim 63, wherein the microphone is configured to capture sounds emanating substantially from a single direction.

65. The public announcement system of claim 63, wherein the microphone is configured to capture sounds emanating from sources that are located within a specified range.

66. The public announcement system of claim 59, wherein the input means comprises a button.

67. The public announcement system of claim 58, further comprising means for ordering the subset prior to displaying the subset.

68. The public announcement system of claim 58, farther comprising means for recording an image of the user.

69. The public announcement system of claim 68, further comprising means for transmitting the image to a remote location.

70. The public announcement system of claim 58, further comprising means for recording the voice of the user.

71. The public announcement system of claim 70, further comprising means for transmitting the voice to a remote location.

72. A method for presenting announcements to a user, comprising:
providing a Group Display Device, a Remote Identification Sensing Device wherein the Remote Identification Sensing Device comprises a transceiver configured to communicate with a transponder using electromagnetic transmission signals, whereby the Remote Identification Sensing Device is capable of communicating with the transponder without direct physical contact between the transceiver and the transponder, and a memory storage area containing a plurality of media elements; and
in response to the activation of the Remote identification Sensing Device, displaying on the Group Display Device a subset of the plurality of media elements;
wherein the subset of the plurality of media elements displayed on the Group Display Device is determined by reference to personal information obtained front the user.

73. The method of claim 72, further comprising obtaining the personal information via a Customer Biometric Sensing Device.

74. The method of claim 72, wherein the personal information is obtained from the user contemporaneously with the activation of the Remote Identification Sensing Device.

75. The method at claim 72, wherein the personal information is obtained via a contemporaneous interaction with the user.

76. A method for generating a customer order, comprising:

provding a Group Display Device, a Remote Identification Sensing Device, wherein the Remote Identification Sensing Device comprises a transceiver configured to communicate with a transponder using electromagnetic transmission signals, whereby the Remote Identification Sensing Device is capable of communicating with the transponder without direct physical contact between the transceiver and the transponder, a first memory storage area containing one or more media elements, and a second memory storage area containing a multiplicity of personal information data sets;

in response to an activation of the Remote identification Sensing Device by a user, associating one or more personal information data sets within the multiplicity of personal information data sets with the user; displaying a subset the one or more media elements to the user on the Group Display Device; and in response to a single input action by the user, generating a set of transaction details;

wherein the set of transaction details is determined by reference to the one or more personal information data sets associated with the user.

77. The method of claim 76, wherein the single action comprises swiping a magnetic card through a card reader.

78. The method of claim 76, wherein the single action comprises selecting a button an a keyboard.

79. The method of claim 76, wherein the single action comprises activating a button on a mouse.

80. The method of claim 76, wherein the single action comprises activating a button on a control panel.

81. The method of claim 76, wherein the single action comprises touching a predefined area on the Group Display Device.

82. The method of claim 76, wherein the single action comprises speaking into a microphone.

83. The method of claim 76, wherein the subset of the one or more media elements displayed on the Group Display Device are determined by reference to the one or more personal information data sets.

84. The method of claim 76, wherein the secondary memory storage area comprises a component of a customer information management infrastructure.

85. The method of claim 76, wherein the secondary memory storage area comprises a component of a customer relationship management system.

86. The method of claim 76, wherein the set of transaction details comprises a customer name; a customer mailing address; and a payment method.

87. The method of claim 76, further comprising: providing a magnetic stripe reader.

88. The method of claim 76, further comprising: providing a card having a readable computer chip.

89. The method of claim 76, wherein the transponder is positioned on a card.

90. The method of claim 76, wherein the transceiver is configured to send and receive wireless signals.

91. The method of claim 90, wherein the transceiver sends and receives wireless signals to and from transponder thereby uniquely identifying the user.

92. The method of claim 76, wherein the Remote Identification Sensing Device comprises a Crowd Evaluation Device.

93. The method of claim 76, further comprising: providing a Customer Biometrics Sensing Device.

94. The method of claim 93, wherein the Customer Biometrics Sensing Device is responsive to a customer's appearance.

95. The method of claim 93, wherein the Customer Biometrics Sensing Device is responsive to a customer's voice.

96. The method of claim 93, wherein the Customer Biometrics Sensing Device is responsive to a customer's iris.

97. The method of claim 93, wherein the Customer Biometrics Sensing Device is responsive to a customer's retina.

98. The method of claim 93, wherein the Customer Biometrics Sensing Device is responsive to a customer's fingerprint.

* * * * *